(12) United States Patent
Onoda

(10) Patent No.: US 8,247,336 B2
(45) Date of Patent: *Aug. 21, 2012

(54) OPTICAL GLASS COMPOSITION, PREFORM AND OPTICAL ELEMENT

(75) Inventor: Minoru Onoda, Osaka (JP)

(73) Assignee: Panasonic Corporation, Osaka (JP)

( * ) Notice: Subject to any disclaimer, the term of this patent is extended or adjusted under 35 U.S.C. 154(b) by 396 days.

This patent is subject to a terminal disclaimer.

(21) Appl. No.: 12/609,442

(22) Filed: Oct. 30, 2009

(65) Prior Publication Data

US 2010/0113248 A1    May 6, 2010

(30) Foreign Application Priority Data

Nov. 5, 2008  (JP) .................. 2008-284326
Nov. 5, 2008  (JP) .................. 2008-284327
Nov. 5, 2008  (JP) .................. 2008-284328
Nov. 5, 2008  (JP) .................. 2008-284329
Nov. 5, 2008  (JP) .................. 2008-284330

(51) Int. Cl.
*C03C 3/155*  (2006.01)
*C03C 3/068*  (2006.01)
*C03C 3/066*  (2006.01)

(52) U.S. Cl. ................. 501/51; 501/50; 501/78; 501/79
(58) Field of Classification Search .......... 501/50, 501/51, 78, 79
See application file for complete search history.

(56) References Cited

U.S. PATENT DOCUMENTS

| | | | | |
|---|---|---|---|---|
| 6,844,279 B2* | 1/2005 | Hayashi et al. | ................. | 501/50 |
| 6,977,232 B2* | 12/2005 | Hayashi et al. | ................. | 501/79 |
| 7,138,349 B2* | 11/2006 | Uehara et al. | ................. | 501/78 |
| 7,897,533 B2* | 3/2011 | Onoda et al. | ................. | 501/78 |
| 8,003,556 B2* | 8/2011 | Suzuki et al. | ................. | 501/78 |
| 2003/0211929 A1 | 11/2003 | Hayashi et al. | | |
| 2004/0145815 A1 | 7/2004 | Endo | | |
| 2005/0192174 A1 | 9/2005 | Yamamoto et al. | | |
| 2005/0209085 A1 | 9/2005 | Endo | | |
| 2006/0234850 A1 | 10/2006 | Hayashi et al. | | |
| 2008/0194395 A1 | 8/2008 | Endo | | |
| 2008/0220961 A1* | 9/2008 | Uehara et al. | ................. | 501/78 |
| 2009/0088310 A1* | 4/2009 | Suzuki et al. | ................. | 501/78 |
| 2009/0163345 A1* | 6/2009 | Onoda et al. | ................. | 501/78 |
| 2011/0195833 A1* | 8/2011 | Kuang et al. | ................. | 501/78 |

FOREIGN PATENT DOCUMENTS

| | | |
|---|---|---|
| JP | 2003-267748 A | 9/2003 |
| JP | 2005-179142 A | 7/2005 |
| JP | 2005-239476 A | 9/2005 |
| JP | 2006-248897 A | 9/2006 |

* cited by examiner

*Primary Examiner* — Karl Group
*Assistant Examiner* — Elizabeth A Bolden
(74) *Attorney, Agent, or Firm* — Pearne & Gordon LLP

(57) ABSTRACT

An optical glass composition contains, in % by mole, 0% or more and 25.0% or less of $SiO_2$, 20.0% or more and 40.0% or less of $B_2O_3$, 0% or more and 5.0% or less of $Li_2O$, 3.0% or more and 15.0% or less of ZnO, 0% or more and 10.0% or less of $ZrO_2$, 2.0% or more and 7.0% or less of $Ta_2O_5$, 6.0% or more and 25.0% or less of $La_2O_3$, 5.0% or more and 22.0% or less of $Gd_2O_3$, 66.5% or less of $La_2O_3+Gd_2O_3+B_2O_3$ and 26.0% or more of $La_2O_3+Gd_2O_3$, and has nd of 1.83 or higher and 1.86 or lower, vd of 43 or higher and 46 or lower and a liquidus temperature of 1300° C. or lower, and a preform and an optical element are formed from the optical glass composition.

28 Claims, No Drawings

OPTICAL GLASS COMPOSITION, PREFORM AND OPTICAL ELEMENT

CROSS-REFERENCE TO RELATED APPLICATION

This application is based on application Nos. 2008-284326, 2008-284327, 2008-284328, 2008-284329 and 2008-284330 filed in Japan on Nov. 5, 2008, the contents of which are hereby incorporated by reference.

BACKGROUND OF THE INVENTION

1. Field of the Invention

The present invention relates to an optical glass composition, a preform and an optical element. In particular, the present invention relates to: an optical glass composition suitable as the material of an optical element such as a lens element contained in a shooting lens system of a digital still camera or a digital video camera (simply referred to as a digital camera, hereinafter); a preform used in producing this optical element by press molding; and this optical element.

2. Description of the Background Art

In recent years, in digital cameras, various types ranging from common types to high-class types have been proposed in accordance with the consumers' needs. Among such digital cameras, in high-class type digital cameras particularly, high performances such as both of wide angle and high magnification are strongly desired as well as thickness reduction for improving portability.

In order to achieve thickness reduction in a digital camera, reduction is indispensable in the thickness of the shooting lens system which occupies a relatively large volume. For the purpose of thickness reduction in a shooting lens system, reduction in the number of lens elements is effective. Nevertheless, in recent years, increasingly high optical performance is required in shooting lens systems. Thus, reduction in the number of lens elements is reaching a limit for increasing magnification particularly, and hence further reduction is unexpectable. Accordingly, for the purpose of thickness reduction in a shooting lens system, thickness reduction becomes necessary in the individual lens elements contained in the shooting lens system.

For the purpose of thickness reduction in a lens element, it is effective to increase the refractive index of the glass material that forms the lens element. For simultaneously achieving the above-mentioned high performances such as both of wide angle and high magnification, it is generally preferable that the dispersion of the lens element is adjusted to relatively lower. As examples of such a glass material having a high refractive index and showing a relatively lower dispersion, optical glass is described in Japanese Laid-Open Patent Publication No. 2003-267748.

In a shooting lens system, it is expected that high performances such as both of wide angle and high magnification in addition to thickness reduction can be realized when a glass material having a high refractive index and showing a relatively lower dispersion is used, for example, for a most object side-negative lens element in a lens unit having negative optical power and also for a positive lens element in a lens unit located on the image side of the lens unit having negative optical power. Also, in an imaging lens system, aberration compensation is necessary. Then, in general, the aberration is compensated by variously combining the optical indices such as the refractive indices (nd) and the dispersions (vd: Abbe numbers) of the lens elements and the shapes of the lens elements. Thus, in order to achieve successful aberration compensation as well as both of thickness reduction and high performances in a shooting lens system, it is desired that for a lens element, a glass material having an Abbe number falling within a prescribed range relative to a high refractive index falling within a prescribed range is selected from glass materials having a high refractive index and showing a relatively lower dispersion. Simultaneously, it is desired that the optical power, the shape and the like of the lens element formed from such a glass material are adjusted to suitable ones, and that the lens element is located on a suitable position.

Japanese Laid-Open Patent Publication No. 2003-267748 discloses optical glass having optical indices such as a refractive index of 1.88 to 1.90 and an Abbe number of 35 to 50. In this optical glass, the refractive index and the Abbe number are defined by a prescribed condition. The optical glass has such a high refractive index. Nevertheless, the dispersion of the optical glass falls within wide range from lower to higher. In order to achieve successful aberration compensation as well as both of thickness reduction and high performances in a shooting lens system, such a lens element is needed as a lens element formed from, for example, a glass material having an Abbe number of approximately 45 relative to a high refractive index of approximately 1.85. Nevertheless, Japanese Laid-Open Patent Publication No. 2003-267748 does not specifically describe a glass material having the above-mentioned specific combination of the refractive index with the Abbe number, and showing excellent melting property, processability (droplet property), crystallinity and the like.

SUMMARY OF THE INVENTION

An object of the present invention is to provide: a high refractive index-lower to middle dispersion type optical glass composition that has a refractive index (nd) to the d-line falling within a high refractive index range of approximately 1.85 and an Abbe number (vd) to the d-line falling within a range of approximately 45, and yet shows excellent melting property, processability (droplet property), crystallinity and the like; and a preform and an optical element formed from the optical glass composition.

(I) The novel concepts disclosed herein were achieved in order to solve the foregoing problems in the conventional art, and herein is disclosed:

an optical glass composition comprising, in % by mole,
0% or more and 25.0% or less of $SiO_2$,
20.0% or more and 40.0% or less of $B_2O_3$,
0% or more and 5.0% or less of $Li_2O$,
3.0% or more and 15.0% or less of ZnO,
0% or more and 10.0% or less of $ZrO_2$,
2.0% or more and 7.0% or less of $Ta_2O_5$,
6.0% or more and 25.0% or less of $La_2O_3$,
5.0% or more and 22.0% or less of $Gd_2O_3$,
66.5% or less of $La_2O_3+Gd_2O_3+B_2O_3$ and
26.0% or more of $La_2O_3+Gd_2O_3$, and having
a refractive index (nd) to the d-line of 1.83 or higher and 1.86 or lower, an Abbe number (vd) to the d-line of 43 or higher and 46 or lower, and a liquidus temperature of 1300° C. or lower.

The novel concepts disclosed herein were achieved in order to solve the foregoing problems in the conventional art, and herein is disclosed:

a preform comprising just above-mentioned optical glass composition, that is softened by heating so as to be used at least for press molding.

The novel concepts disclosed herein were achieved in order to solve the foregoing problems in the conventional art, and herein is disclosed:

an optical element comprising just above-mentioned optical glass composition.

(II) The novel concepts disclosed herein were achieved in order to solve the foregoing problems in the conventional art, and herein is disclosed:

an optical glass composition comprising, in % by mole,
5.0% or more and 25.0% or less of $SiO_2$,
25.0% or more and 40.0% or less of $B_2O_3$,
10.0% or more and 15.0% or less of ZnO,
0% or more and 5.0% or less of $ZrO_2$,
10.0% or more and 25.0% or less of $La_2O_3$,
5.0% or more and 20.0% or less of $Gd_2O_3$ and
0% or more and 5.0% or less of $Ta_2O_5$, wherein
$La_2O_3/Gd_2O_3$ is, in molar ratio, more than 0 and less than 3.5, wherein
the composition substantially contains no $Li_2O$, and wherein
the composition has a refractive index (nd) to the d-line of 1.83 or higher and 1.87 or lower, an Abbe number (vd) to the d-line of 43 or higher and 47 or lower, and a liquidus temperature of 1300° C. or lower.

The novel concepts disclosed herein were achieved in order to solve the foregoing problems in the conventional art, and herein is disclosed:

a preform comprising just above-mentioned optical glass composition, that is softened by heating so as to be used at least for press molding.

The novel concepts disclosed herein were achieved in order to solve the foregoing problems in the conventional art, and herein is disclosed:

an optical element comprising just above-mentioned optical glass composition.

(III) The novel concepts disclosed herein were achieved in order to solve the foregoing problems in the conventional art, and herein is disclosed:

an optical glass composition comprising, in % by mole,
5.0% or more and 25.0% or less of $SiO_2$,
20.0% or more and 40.0% or less of $B_2O_3$,
0% or more and 15.0% or less of ZnO,
0% or more and 5.0% or less of $ZrO_2$,
10.0% or more and 25.0% or less of $La_2O_3$,
0% or more and 5.0% or less of $Ta_2O_5$ and
5.0% or more and 20.0% or less of $Gd_2O_3$, wherein
$SiO_2/B_2O_3$ is, in molar ratio, 0.25 or more and 0.90 or less, wherein
the composition substantially contains no $Li_2O$, and wherein
the composition has a refractive index (nd) to the d-line of 1.83 or higher and 1.87 or lower, an Abbe number (vd) to the d-line of 43 or higher and 47 or lower, and a liquidus temperature of 1300° C. or lower.

The novel concepts disclosed herein were achieved in order to solve the foregoing problems in the conventional art, and herein is disclosed:

a preform comprising just above-mentioned optical glass composition, that is softened by heating so as to be used at least for press molding.

The novel concepts disclosed herein were achieved in order to solve the foregoing problems in the conventional art, and herein is disclosed:

an optical element comprising just above-mentioned optical glass composition.

(IV) The novel concepts disclosed herein were achieved in order to solve the foregoing problems in the conventional art, and herein is disclosed:

an optical glass composition comprising, in % by mole,
0% or more and 10.0% or less of $SiO_2$,
30.0% or more and 45.0% or less of $B_2O_3$,
0% or more and 5.0% or less of $Li_2O$,
0% or more and 12.0% or less of ZnO,
0% or more and 10.0% or less of $ZrO_2$,
10.0% or more and 20.0% or less of $La_2O_3$,
3.0% or more and 10.0% or less of $Ta_2O_5$,
11.0% or more and 20.0% or less of $Ta_2O_5+ZrO_2$ and
5.0% or more and 20.0% or less of $Gd_2O_3$, and having
a refractive index (nd) to the d-line of 1.83 or higher and 1.86 or lower, an Abbe number (vd) to the d-line of 43 or higher and 45 or lower, and a liquidus temperature of 1200° C. or lower.

The novel concepts disclosed herein were achieved in order to solve the foregoing problems in the conventional art, and herein is disclosed:

a preform comprising just above-mentioned optical glass composition, that is softened by heating so as to be used at least for press molding.

The novel concepts disclosed herein were achieved in order to solve the foregoing problems in the conventional art, and herein is disclosed:

an optical element comprising just above-mentioned optical glass composition.

(V) The novel concepts disclosed herein were achieved in order to solve the foregoing problems in the conventional art, and herein is disclosed:

an optical glass composition comprising, in % by mole,
0% or more and 10.0% or less of $SiO_2$,
35.0% or more and 45.0% or less of $B_2O_3$,
0% or more and 5.0% or less of $Li_2O$,
0% or more and 12.0% or less of ZnO,
0% or more and 10.0% or less of $ZrO_2$,
10.0% or more and 20.0% or less of $La_2O_3$,
3.0% or more and 10.0% or less of $Ta_2O_5$,
10.0% or more and 22.0% or less of $Ta_2O_5+ZnO$ and
5.0% or more and 20.0% or less of $Gd_2O_3$, and having
a refractive index (nd) to the d-line of 1.83 or higher and 1.86 or lower, an Abbe number (vd) to the d-line of 43 or higher and 46 or lower, and a liquidus temperature of 1200° C. or lower.

The novel concepts disclosed herein were achieved in order to solve the foregoing problems in the conventional art, and herein is disclosed:

a preform comprising just above-mentioned optical glass composition, that is softened by heating so as to be used at least for press molding.

The novel concepts disclosed herein were achieved in order to solve the foregoing problems in the conventional art, and herein is disclosed:

an optical element comprising just above-mentioned optical glass composition.

(I) The present invention realizes a high refractive index-lower to middle dispersion type optical glass composition that has a refractive index (nd) to the d-line falling within a high refractive index range of 1.83 or higher and 1.86 or lower and an Abbe number (vd) to the d-line falling within a range of 43 or higher and 46 or lower, and yet has a liquidus temperature of 1300° C. or lower.

The present invention further realizes a preform used in producing an optical element by press molding from a high refractive index-lower to middle dispersion type optical glass composition that has a refractive index (nd) to the d-line falling within a high refractive index range of 1.83 or higher and 1.86 or lower and an Abbe number (vd) to the d-line falling within a range of 43 or higher and 46 or lower, and yet has a liquidus temperature of 1300° C. or lower.

The present invention yet further realizes an optical element formed from a high refractive index-lower to middle dispersion type optical glass composition that has a refractive index (nd) to the d-line falling within a high refractive index range of 1.83 or higher and 1.86 or lower and an Abbe number (vd) to the d-line falling within a range of 43 or higher and 46 or lower, and yet has a liquidus temperature of 1300° C. or lower.

(II) The present invention realizes a high refractive index-lower to middle dispersion type optical glass composition that has a refractive index (nd) to the d-line falling within a high refractive index range of 1.83 or higher and 1.87 or lower and an Abbe number (vd) to the d-line falling within a range of 43 or higher and 47 or lower, and yet has a liquidus temperature of 1300° C. or lower.

The present invention further realizes a preform used in producing an optical element by press molding from a high refractive index-lower to middle dispersion type optical glass composition that has a refractive index (nd) to the d-line falling within a high refractive index range of 1.83 or higher and 1.87 or lower and an Abbe number (vd) to the d-line falling within a range of 43 or higher and 47 or lower, and yet has a liquidus temperature of 1300° C. or lower.

The present invention yet further realizes an optical element formed from a high refractive index-lower to middle dispersion type optical glass composition that has a refractive index (nd) to the d-line falling within a high refractive index range of 1.83 or higher and 1.87 or lower and an Abbe number (vd) to the d-line falling within a range of 43 or higher and 47 or lower, and yet has a liquidus temperature of 1300° C. or lower.

(III) The present invention realizes a high refractive index-lower to middle dispersion type optical glass composition that has a refractive index (nd) to the d-line falling within a high refractive index range of 1.83 or higher and 1.87 or lower and an Abbe number (vd) to the d-line falling within a range of 43 or higher and 47 or lower, and yet has a liquidus temperature of 1300° C. or lower.

The present invention further realizes a preform used in producing an optical element by press molding from a high refractive index-lower to middle dispersion type optical glass composition that has a refractive index (nd) to the d-line falling within a high refractive index range of 1.83 or higher and 1.87 or lower and an Abbe number (vd) to the d-line falling within a range of 43 or higher and 47 or lower, and yet has a liquidus temperature of 1300° C. or lower.

The present invention yet further realizes an optical element formed from a high refractive index-lower to middle dispersion type optical glass composition that has a refractive index (nd) to the d-line falling within a high refractive index range of 1.83 or higher and 1.87 or lower and an Abbe number (vd) to the d-line falling within a range of 43 or higher and 47 or lower, and yet has a liquidus temperature of 1300° C. or lower.

(IV) The present invention realizes a high refractive index-lower to middle dispersion type optical glass composition that has a refractive index (nd) to the d-line falling within a high refractive index range of 1.83 or higher and 1.86 or lower and an Abbe number (vd) to the d-line falling within a range of 43 or higher and 45 or lower, and yet has a liquidus temperature of 1200° C. or lower.

The present invention further realizes a preform used in producing an optical element by press molding from a high refractive index-lower to middle dispersion type optical glass composition that has a refractive index (nd) to the d-line falling within a high refractive index range of 1.83 or higher and 1.86 or lower and an Abbe number (vd) to the d-line falling within a range of 43 or higher and 45 or lower, and yet has a liquidus temperature of 1200° C. or lower.

The present invention yet further realizes an optical element formed from a high refractive index-lower to middle dispersion type optical glass composition that has a refractive index (nd) to the d-line falling within a high refractive index range of 1.83 or higher and 1.86 or lower and an Abbe number (vd) to the d-line falling within a range of 43 or higher and 45 or lower, and yet has a liquidus temperature of 1200° C. or lower.

(V) The present invention realizes a high refractive index-lower to middle dispersion type optical glass composition that has a refractive index (nd) to the d-line falling within a high refractive index range of 1.83 or higher and 1.86 or lower and an Abbe number (vd) to the d-line falling within a range of 43 or higher and 46 or lower, and yet has a liquidus temperature of 1200° C. or lower.

The present invention further realizes a preform used in producing an optical element by press molding from a high refractive index-lower to middle dispersion type optical glass composition that has a refractive index (nd) to the d-line falling within a high refractive index range of 1.83 or higher and 1.86 or lower and an Abbe number (vd) to the d-line falling within a range of 43 or higher and 46 or lower, and yet has a liquidus temperature of 1200° C. or lower.

The present invention yet further realizes an optical element formed from a high refractive index-lower to middle dispersion type optical glass composition that has a refractive index (nd) to the d-line falling within a high refractive index range of 1.83 or higher and 1.86 or lower and an Abbe number (vd) to the d-line falling within a range of 43 or higher and 46 or lower, and yet has a liquidus temperature of 1200° C. or lower.

This and other objects and features of this invention will become clear from the following description, taken in conjunction with the preferred embodiments.

DESCRIPTION OF THE PREFERRED EMBODIMENTS (Embodiment I-1)

First, an optical glass composition according to Embodiment I-1 of the present invention is described below in detail. This optical glass composition has the following composition.

That is, the optical glass composition according to the present Embodiment I-1 contains, in % by mole, 0% or more and 25.0% or less of $SiO_2$, 20.0% or more and 40.0% or less of $B_2O_3$, 0% or more and 5.0% or less of $Li_2O$, 3.0% or more and 15.0% or less of ZnO, 0% or more and 10.0% or less of $ZrO_2$, 2.0% or more and 7.0% or less of $Ta_2O_5$, 6.0% or more and 25.0% or less of $La_2O_3$, 5.0% or more and 22.0% or less of $Gd_2O_3$, 66.5% or less of $La_2O_3+Gd_2O_3+B_2O_3$ and 26.0% or more of $La_2O_3+Gd_2O_3$. From this optical glass composition, more stable high refractive index-lower to middle dispersion type optical glass is obtained that has a refractive index (nd) to the d-line of 1.83 or higher and 1.86 or lower and an Abbe number (vd) to the d-line of 43 or higher and 46 or lower, and yet has a liquidus temperature of 1300° C. or lower.

Next, the individual components contained in the optical glass composition are described below in detail. Hereinafter, the contents of the individual components are expressed in % by mole.

$SiO_2$ serves as a component for composing a network, and is a component for improving devitrification resistance. Nevertheless, when an excessive amount of $SiO_2$ is used, its solubility becomes poor, and hence difficulty arises in stable preparing. Thus, the amount of $SiO_2$ is set to be 0% or more and 25.0% or less and, preferably, 0% or more and 23.0% or less. Here, in order to prevent the devitrification resistance from becoming poor and the glass from becoming unstable, it is preferable that the amount of $SiO_2$ is 13.0% or more.

$B_2O_3$ serves as a component for composing a network, and has the effect of lowering a temperature range necessary for ensuring a desired melting property and a desired viscous flow. Nevertheless, when the amount of $B_2O_3$ exceeds 40.0%, the refractive index becomes excessively low. In contrast, when the amount of $B_2O_3$ is less than 20.0%, the temperature range necessary for ensuring a desired melting property and a desired fluidity becomes excessively high. A preferable amount of $B_2O_3$ is 25.0% or more and 36.0% or less.

$Li_2O$ has the effect of lowering glass transition temperature (denoted by Tg, hereinafter) so as to improve the melting property. Nevertheless, when an excessive amount of $Li_2O$ is used, remarkable degradation arises in the devitrification resistance and the refractive index. Thus, the amount of $Li_2O$ is set to be 0% or more and 5.0% or less and, preferably, 0% or more and 3.0% or less. Here, in order that Tg should be lowered so that the effect of improving the melting property should be achieved more successfully, it is preferable that the amount of $Li_2O$ is 0.5% or more.

Similarly to $Li_2O$, $K_2O$ and $Na_2O$ have the effect of lowering Tg so as to improve the melting property. Nevertheless, the use of $K_2O$ and $Na_2O$ causes a possibility that remarkable degradation of the devitrification resistance and the refractive index is accelerated. Thus, when $K_2O$ and $Na_2O$ need be used, the amount of each is set to be 0% or more and 6.0% or less.

ZnO has the effects of improving the devitrification resistance and lowering the temperature necessary for viscous flow. Nevertheless, when the amount of ZnO exceeds 15.0%, difficulty arises in adjusting the refractive index (nd) and the Abbe number (vd) into desired ranges. In contrast, when the amount of ZnO is less than 3.0%, the effects of improving the devitrification resistance and lowering the temperature necessary for viscous flow become insufficient. A preferable amount of ZnO is 6.0% or more and 14.0% or less.

$ZrO_2$ has the effects of improving the refractive index and also improving the devitrification resistance. Nevertheless, when an excessive amount of $ZrO_2$ is used, the devitrification resistance becomes poor and so does the solubility. The amount of $ZrO_2$ is 0% or more and 10.0% or less. Here, in order that the effects of improving the refractive index and also improving the devitrification resistance should be achieved more successfully, it is preferable that the amount of $ZrO_2$ is 1.0% or more.

$Ta_2O_5$ improves the refractive index, and is one of the components that control the Abbe number. Nevertheless, when the amount of $Ta_2O_5$ exceeds 7.0%, the melting property becomes poor, and hence difficulty arises in preparing. In contrast, when the amount of $Ta_2O_5$ is less than 2.0%, the effect of improving the refractive index becomes insufficient. A preferable amount of $Ta_2O_5$ is 2.2% or more and 4.0% or less.

Similarly to $Ta_2O_5$, $La_2O_3$ improves the refractive index, and is one of the most important components that control the Abbe number. When the amount of $La_2O_3$ is less than 6.0%, difficulty arises in adjusting the Abbe number into a desired range. In contrast, when the amount of $La_2O_3$ exceeds 25.0%, the devitrification resistance becomes poor. Thus, glass becomes unstable, and hence difficulty arises in preparing. A preferable amount of $La_2O_3$ is 11.0% or more and 22.0% or less.

Similarly to $La_2O_3$, $Gd_2O_3$ improves the refractive index, and is one of the components that control the Abbe number. Nevertheless, when the amount of $Gd_2O_3$ exceeds 22.0%, the devitrification resistance becomes poor. Thus, glass becomes unstable, and hence difficulty arises in preparing. In contrast, the amount of $Gd_2O_3$ is less than 5.0%, the effect of improving the refractive index becomes insufficient. A preferable amount of $Gd_2O_3$ is 9.0% or more and 19.0% or less.

Here, in order that the liquidus temperature should be decreased to a desired range, the total amount of $La_2O_3$, $Gd_2O_3$ and $B_2O_3$ ($La_2O_3+Gd_2O_3+B_2O_3$) is adjusted into 66.5% or less. Here, when the total amount is too small, improvement of the refractive index becomes insufficient, and lowering of a temperature range necessary for ensuring a desired melting property and a desired viscous flow becomes insufficient. Thus, the total amount is adjusted preferably into 50.0% or more.

Here, in order that the Abbe number should be increased to a desired range, the total amount of $La_2O_3$ and $Gd_2O_3$ ($La_2O_3+Gd_2O_3$) is adjusted into 26.0% or more and, preferably, into 28.0% or more. Here, when the total amount is excessive, the devitrification resistance becomes poor. Thus, the total amount is adjusted preferably into 35.0% or less.

$GeO_2$ may be used as a replacement of $SiO_2$, and serves as a component for composing a network. Nevertheless, when an excessive amount of $GeO_2$ is used, this causes a possibility that the devitrification resistance becomes poor. Thus, it is preferable that the amount of $GeO_2$ is 0% or more and 16.0% or less and, more preferably, 0% or more and 8.0% or less.

BaO is a component that improves preparing property, and may be used within a range of 0% or more and 6.0% or less. Here, alkaline earth metal oxides R'O (here, R' is at least one of Sr, Ca and Mg) other than the BaO have a tendency that when an excessive amount is used, the devitrification resistance becomes poor. Thus, non-use of these is preferable. Accordingly, when the use of R'O is unavoidable, it is preferable that their total amount is set to be 10.0% or less.

Similarly to $La_2O_3$, $Nb_2O_5$ improves the refractive index, and is one of the components that control the Abbe number. Further, when $La_2O_3$ is replaced by $Nb_2O_5$, the effect of improving the devitrification resistance is also obtained. Nevertheless, when an excessive amount of $Nb_2O_5$ is used, difficulty arises in adjusting the Abbe number into a desired range. Thus, the amount of $Nb_2O_5$ is set to be 0% or more and 3.0% or less and, preferably, 0% or more and 2.0% or less. Here, in order that the effect of improving the refractive index and the devitrification resistance should be achieved more successfully, it is preferable that the amount of $Nb_2O_5$ is 0.5% or more.

$TiO_2$ has the effects of controlling the refractive index and the Abbe number and improving the devitrification resistance. Nevertheless, when an excessive amount of $TiO_2$ is used, difficulty arises in adjusting the Abbe number into a desired range. Thus, the amount of $TiO_2$ is set to be 0% or more and 3.0% or less and, preferably, 0% or more and 2.0% or less. Here, in order that the effect of improving the refractive index and the devitrification resistance should be achieved more successfully, it is preferable that the amount of $TiO_2$ is 0.5% or more.

Similarly to $La_2O_3$, $Y_2O_3$ and $Yb_2O_3$ improve the refractive index, and are components that control the Abbe number.

Nevertheless, when an excessive amount of these $Y_2O_3$ and $Yb_2O_3$ is used, the devitrification resistance becomes poor. Thus, glass becomes unstable, and hence difficulty arises in preparing. Thus, when $La_2O_3$ need be replaced by these $Y_2O_3$ and $Yb_2O_3$, it is preferable that the amount of each is set to be 0% or more and 3.0% or less.

$WO_3$ is a component for alleviating the high devitrification caused by $La_2O_3$ and adjusting the refractive index and the Abbe number into desired ranges. Nevertheless, when an excessive amount of $WO_3$ is used, this causes a possibility that the transmissivity in a blue light range becomes poor. Thus, the amount of $WO_3$ is 0% or more and 3.0% or less and, preferably, 0% or more and 2.0% or less. Here, in order that the effects of alleviating the high devitrification caused by $La_2O_3$ and adjusting the refractive index and the Abbe number into desired ranges should be achieved more successfully, it is preferable that the amount of $WO_3$ is 0.5% or more.

$Al_2O_3$ may be used for adjusting the refractive index. However, it is preferable that the amount is 0% or more and 10% or less. Further, in order to adjust the refractive index, $Ga_2O_3$ and $In_2O_3$ may be used in an amount up to approximately 10% each. Nevertheless, the use of these causes a possibility that the devitrification resistance becomes poor. Thus, it is preferable that these are not used in an excessive amount.

In addition to the above-mentioned components, $Sb_2O_3$ and $SnO_2$ may be used which are generally used as fining agents. Here, it is preferable that the amount of $Sb_2O_3$ and $SnO_2$ is 0% or more and 2% or less each. Nevertheless, $As_2O_3$ having a strong effect as a fining agent is toxic. Thus, it is preferable that $As_2O_3$ is not used.

In addition, as for Pb and its compounds, compounds including Te, Se, or Cd, as well as radioactive substances such as compounds including U or Th, it is preferable that they are not used from the viewpoint of safety. Further, it is also preferable that substances such as compounds including Cu, Cr, V, Fe, Ni or Co that cause coloring are not used.

When the individual components are adjusted into the above-mentioned ratios, a high refractive index-lower to middle dispersion type optical glass composition is obtained that has a refractive index (nd) to the d-line of 1.83 or higher and 1.86 or lower and an Abbe number (vd) to the d-line of 43 or higher and 46 or lower, and yet has a liquidus temperature of 1300° C. or lower.

Here, when the glass is handled in a softened or molten state, from the viewpoints of melting property, processability (droplet property), crystallinity and the like, a lower liquidus temperature is generally preferable in the optical glass. Accordingly, as mentioned above, the optical glass composition according to the present Embodiment I-1 has a liquidus temperature of 1300° C. or lower and, preferably, 1295° C. or lower.

(Embodiment I-2)

Next, a preform according to Embodiment I-2 of the present invention and a producing method for the same are described below in detail. The preform is softened by heating so as to be used at least for press molding. Thus, the weight and the shape of the preform are determined appropriately in accordance with the size and the shape of a press molded article serving as a final target. The preform according to the present Embodiment I-2 is formed from the optical glass composition according to the above-mentioned Embodiment I-1, and hence obtained without losing various features of the optical glass composition in Embodiment I-1.

The preform produced from the optical glass composition according to Embodiment I-1 is described below. Here, the preform is a preliminary glass form that is heated and used for precision press molding. The preforms are divided into a gob preform produced by forming a molten glass material and a polished preform produced by physically polishing a glass material. The optical glass composition according to Embodiment I-1 can be used for both of the gob preform and the polished preform.

The producing method for the preform is described below. First, glass raw materials (the above-mentioned individual components) for the optical glass composition according to the above-mentioned Embodiment I-1 are weighed and prepared, and then processed in processing steps such as dissolution, defoaming, fining and homogenization so that homogeneous molten glass is obtained which contains no foreign substances therein. Then, at the time when the molten glass is caused to flow out through an outflow pipe (referred to as a nozzle, hereinafter) made of platinum alloy or the like, a temperature condition for the vicinity of the nozzle is set up strictly into a range of not causing devitrification in the glass. The molten glass flowing out is cast into a receiving die having a receiving surface of planar shape, concave shape, convex shape or the like or into a molding die in which an enclosure is provided in the circumference of a planar surface, a concave surface or a convex surface. As a result, the molten glass is formed into a desired shape. In the following description, preferable forming methods are illustrated.

A first forming method is one example of producing methods for the gob preform. First, a molten glass lump having a weight corresponding to a final molded article or alternatively a desired weight including an addition necessary for secondary processing into a final molded article is dropped into each of a plurality of receiving dies arranged under the nozzle. Then, cooling is performed simultaneously to the forming of glass lumps so that gob preforms are obtained.

A second forming method is another example of producing methods for the gob preform. The second forming method is suitable for a case that a preform having a relatively heavy weight is to be produced. First, the tip of the molten glass flowing out through the nozzle is brought into contact with the receiving die surface. Then, at each time when a desired weight is reached, the receiving die is rapidly separated from the molten glass so that the molten glass is cut off. As a result, the forming of glass free from striae and shear marks is achieved. Further, when necessary, press molding may be performed with aiming simultaneously at cooling of the molten glass lump, so that a desired shape may be imparted and gob preforms are obtained.

A third forming method is one example of producing methods for the polished preform. First, a glass lump having a desired shape is produced by a similar method to the first and the second forming methods. At this time, the glass lump having a desired shape has a total weight of a desired weight plus an additional weight necessary for finishing all the surfaces including optically functional surfaces of a final product (such as a lens) by means of machining. Then, the glass lump having a desired shape is cut and polished by means of machining so that polished preforms are obtained.

The preform obtained by each of the first and the second forming methods described above can be used as a preform for press molding directly in precision press molding. Further, the third forming method provides a preform for polish. In order that breakage should be avoided in the preform at the time of handling, for example, a three-dimensional cooling method, an optimal cooling rate, an annealing treatment and the like may be selected depending on the shape and the weight.

As described above, a preform for press molding and a preform for polish having a desired weight can be obtained from the optical glass composition according to Embodiment I-1. In the case of a preform for press molding, for the purpose of mold release at the time of forming, it is preferable that the surface roughness of the receiving die surface is adjusted or alternatively that a mold-release film is formed. In the case of a preform for polish, when an HBN (boron-containing mold-releasing agent) is applied, releasing from the die becomes easier. Thus, this approach is preferable.

(Embodiment I-3)

Next, an optical element according to Embodiment I-3 of the present invention is described below. The optical element according to Embodiment I-3 has optical indices determined by the composition of the optical glass composition according to the above-mentioned Embodiment I-1. That is, the refractive index (nd) to the d-line is 1.83 to 1.86, while the Abbe number (vd) to the d-line is 43 to 46, and while the liquidus temperature is 1300° C. or lower. Further, this optical element has also a feature that optical absorption by coloring is low in a visible light range. The optical element employing the optical glass composition according to Embodiment I-1 is an optical element suitable for an optical system in a digital camera, a video camera, a mobile device or the like.

Examples of the optical element according to the present Embodiment I-3 include a spherical lens, an aspheric lens and a micro lens, as well as a prism and a diffraction grating. Other examples include an optical element cemented with an optical element composed of a glass material or an optical material of another kind.

Next, a producing method for the optical element according to Embodiment I-3 is described below. The optical element according to Embodiment I-3 can be produced by supplying the preform according to the above-mentioned Embodiment I-2 into a molding die, then softening it by heating, then performing press molding, and then performing polish when necessary.

Press molding methods employable for obtaining the optical element are divided into two typical methods. These methods are selected depending on the means of forming optically functional surfaces where light enters and exits.

First means is means referred to as precision press molding. The molding surfaces of a press molding die are precisely processed in advance into reversal shapes of the optically functional surfaces of the optical element serving as a final molded article. Then, when necessary, a mold-release film is provided in order to avoid fusion between the preform and the molding die. Then, press molding is performed so that the shape of the above-mentioned molding surface is precisely transferred to the preform for press molding having been softened by heating. According to this means, grinding and polishing of optically functional surfaces are unnecessary. That is, the optical element can be produced solely by press molding. The press molding is performed in an inert atmosphere like in nitrogen gas. Here, when a preform for press molding having an additional weight relative to the final molded article is used, for example, in the case of a lens, centering may be performed by grinding by the amount corresponding to the additional weight.

Second means is that press molding is performed using a preform for polish having a shape which is similar to the shape of the optical element serving as a final molded article and which is larger than the optical element. The formed press molded article contains optically functional surfaces, and the surfaces of the optical element are formed by machining. In the press molded article, in order that breakage that could be caused by the machining should be avoided in the glass, residual strain need be minimized. Further, also in order that required optical indices should be achieved, an appropriate annealing treatment is necessary. According to this means, press molding may be performed in an ordinary atmosphere. Further, the above-mentioned mold-releasing agent may be used.

Here, in both cases regardless of whether the first means or the second means described above is selected, the refractive index (nd) and the Abbe number (vd) of the obtained optical element varies slightly owing to the heat history in the producing process. Thus, when an optical element having precisely specified optical indices is to be produced, component adjustment for the optical glass composition, heat history adjustment in the producing process, adjustment of incorporating the amount of variation into the optical design when necessary, or the like may be selected appropriately with taking into consideration the above-mentioned variation in the refractive index (nd) and the Abbe number (vd). As a result, an optical element is obtained that has desired optical indices and an excellent transmissivity and that is particularly suitable as an optical component of a device which incorporates a solid-state image sensor or the like.

(Embodiment II-1)

First, an optical glass composition according to Embodiment II-1 of the present invention is described below in detail. This optical glass composition has the following composition.

That is, the optical glass composition according to the present Embodiment II-1 contains, in % by mole, 5.0% or more and 25.0% or less of $SiO_2$, 25.0% or more and 40.0% or less of $B_2O_3$, 10.0% or more and 15.0% or less of ZnO, 0% or more and 5.0% or less of $ZrO_2$, 10.0% or more and 25.0% or less of $La_2O_3$, 5.0% or more and 20.0% or less of $Gd_2O_3$ and 0% or more and 5.0% or less of $Ta_2O_5$, and in this optical glass composition, $La_2O_3/Gd_2O_3$ is, in molar ratio, more than 0 and less than 3.5. Also, this optical glass composition substantially contains no $Li_2O$. From this optical glass composition, more stable high refractive index-lower to middle dispersion type optical glass is obtained that has a refractive index (nd) to the d-line of 1.83 or higher and 1.87 or lower and an Abbe number (vd) to the d-line of 43 or higher and 47 or lower, and yet has a liquidus temperature of 1300° C. or lower.

Next, the individual components contained in the optical glass composition are described below in detail. Hereinafter, the contents of the individual components are expressed in % by mole.

$SiO_2$ serves as a component for composing a network, and is an essential component for improving devitrification resistance. Nevertheless, when the amount of $SiO_2$ exceeds 25.0%, its solubility becomes poor, and hence difficulty arises in stable preparing. Further, its liquidus temperature goes high, and hence difficulty arises in preparing. In contrast, when the amount of $SiO_2$ is less than 5.0%, the devitrification resistance becomes poor, and hence the glass becomes unstable. A preferable amount of $SiO_2$ is 8.0% or more and 23.0% or less.

$B_2O_3$ serves as a component for composing a network, and has the effect of lowering a temperature range necessary for ensuring a desired melting property and a desired viscous flow. Nevertheless, when the amount of $B_2O_3$ exceeds 40.0%, the refractive index becomes excessively low. In contrast, when the amount of $B_2O_3$ is less than 25.0%, the temperature range necessary for ensuring a desired melting property and a desired fluidity becomes excessively high. A preferable amount of $B_2O_3$ is 26.0% or more and 39.0% or less.

ZnO has the effects of improving the devitrification resistance and lowering the temperature necessary for viscous flow. Nevertheless, when the amount of ZnO exceeds 15.0%, difficulty arises in adjusting the refractive index (nd) and the Abbe number (vd) into desired ranges. In contrast, when the amount of ZnO is less than 10.0%, the effects of improving the devitrification resistance and lowering the temperature necessary for viscous flow become insufficient. A preferable amount of ZnO is 13.0% or more and 14.5% or less.

$ZrO_2$ has the effects of improving the refractive index and also improving the devitrification resistance. Nevertheless, when an excessive amount of $ZrO_2$ is used, the devitrification resistance becomes poor and so does the solubility. The amount of $ZrO_2$ is 0% or more and 5.0% or less, preferably, 0% or more and 3.0% or less. Here, in order that the effects of improving the refractive index and also improving the devitrification resistance should be achieved more successfully, it is preferable that the amount of $ZrO_2$ is 1.0% or more.

$La_2O_3$ improves the refractive index, and is one of the most important components that control the Abbe number. When the amount of $La_2O_3$ is less than 10.0%, difficulty arises in adjusting the Abbe number into a desired range. In contrast, when the amount of $La_2O_3$ exceeds 25.0%, the devitrification resistance becomes poor. Thus, glass becomes unstable, and hence difficulty arises in preparing. A preferable amount of $La_2O_3$ is 11.0% or more and 22.0% or less.

Similarly to $La_2O_3$, $Gd_2O_3$ improves the refractive index, and is one of the components that control the Abbe number. Nevertheless, when the amount of $Gd_2O_3$ exceeds 20.0%, the devitrification resistance becomes poor. Thus, glass becomes unstable, and hence difficulty arises in preparing. In contrast, the amount of $Gd_2O_3$ is less than 5.0%, the effect of improving the refractive index becomes insufficient. A preferable amount of $Gd_2O_3$ is 9.0% or more and 19.0% or less.

Similarly to $La_2O_3$, $Ta_2O_5$ improves the refractive index, and is one of the components that control the Abbe number. Nevertheless, when an excessive amount of $Ta_2O_5$ is used, the melting property becomes poor, and hence difficulty arises in preparing. Thus, the amount of $Ta_2O_5$ is set to be 0% or more and 5.0% or less and, preferably, 0% or more and 4.0% or less. Here, in order that the effect of improving the refractive index should be achieved more successfully, it is preferable that the amount of $Ta_2O_5$ is 1.0% or more.

Here, in order to prevent the devitrification resistance from becoming poor, the molar ratio of $La_2O_3$ to $Gd_2O_3$, that is "$La_2O_3/Gd_2O_3$", is adjusted into less than 3.5, preferably, into 2.5 or less. Here, the molar ratio is more than 0. In contrast, when the amount of $La_2O_3$ is too small, there is a possibility that the devitrification resistance becomes poor. Accordingly, in order that the effect of the devitrification resistance should be achieved more successfully, it is preferable that the molar ratio is 0.5 or more.

$Li_2O$ has the effect of lowering Tg so as to improve the melting property. Nevertheless, $Li_2O$ prevents the liquidus temperature from lowering, and degrades the devitrification resistance and the refractive index. Accordingly, the optical glass composition according to the present Embodiment II-1 does not contain $Li_2O$ substantially.

Similarly to $Li_2O$, $K_2O$ and $Na_2O$ have the effect of lowering Tg so as to improve the melting property. Nevertheless, the use of $K_2O$ and $Na_2O$ causes a possibility that remarkable degradation of the devitrification resistance and the refractive index is accelerated. Thus, when $K_2O$ and $Na_2O$ need be used, the amount of each is set to be 0% or more and 6.0% or less.

$GeO_2$ may be used as a replacement of $SiO_2$, and serves as a component for composing a network. Nevertheless, when an excessive amount of $GeO_2$ is used, this causes a possibility that the devitrification resistance becomes poor. Thus, it is preferable that the amount of $GeO_2$ is 0% or more and 16.0% or less and, more preferably, 0% or more and 8.0% or less.

BaO is a component that improves preparing property, and may be used within a range of 0% or more and 6.0% or less.

Here, alkaline earth metal oxides R'O (here, R' is at least one of Sr, Ca and Mg) other than the BaO have a tendency that when an excessive amount is used, the devitrification resistance becomes poor. Thus, non-use of these is preferable. Accordingly, when the use of R'O is unavoidable, it is preferable that their total amount is set to be 10.0% or less.

Similarly to $La_2O_3$, $Nb_2O_5$ improves the refractive index, and is one of the components that control the Abbe number. Further, when $La_2O_3$ is replaced by $Nb_2O_5$, the effect of improving the devitrification resistance is also obtained. Nevertheless, when an excessive amount of $Nb_2O_5$ is used, difficulty arises in adjusting the Abbe number into a desired range. Thus, the amount of $Nb_2O_5$ is set to be 0% or more and 3.0% or less and, preferably, 0% or more and 2.0% or less. Here, in order that the effect of improving the refractive index and the devitrification resistance should be achieved more successfully, it is preferable that the amount of $Nb_2O_5$ is 0.5% or more.

$TiO_2$ has the effects of controlling the refractive index and the Abbe number and improving the devitrification resistance. Nevertheless, when an excessive amount of $TiO_2$ is used, difficulty arises in adjusting the Abbe number into a desired range. Thus, the amount of $TiO_2$ is set to be 0% or more and 3.0% or less and, preferably, 0% or more and 2.0% or less. Here, in order that the effect of improving the refractive index and the devitrification resistance should be achieved more successfully, it is preferable that the amount of $TiO_2$ is 0.5% or more.

Similarly to $La_2O_3$, $Y_2O_3$ and $Yb_2O_3$ improve the refractive index, and are components that control the Abbe number. Nevertheless, when an excessive amount of these $Y_2O_3$ and $Yb_2O_3$ is used, the devitrification resistance becomes poor. Thus, glass becomes unstable, and hence difficulty arises in preparing. Thus, when $La_2O_3$ need be replaced by these $Y_2O_3$ and $Yb_2O_3$, it is preferable that the amount of each is set to be 0% or more and 3.0% or less.

$WO_3$ is a component for alleviating the high devitrification caused by $La_2O_3$ and adjusting the refractive index and the Abbe number into desired ranges. Nevertheless, when an excessive amount of $WO_3$ is used, this causes a possibility that the transmissivity in a blue light range becomes poor. Thus, the amount of $WO_3$ is 0% or more and 3.0% or less and, preferably, 0% or more and 2.0% or less. Here, in order that the effects of alleviating the high devitrification caused by $La_2O_3$ and adjusting the refractive index and the Abbe number into desired ranges should be achieved more successfully, it is preferable that the amount of $WO_3$ is 0.5% or more.

$Al_2O_3$ may be used for adjusting the refractive index. However, it is preferable that the amount is 0% or more and 10% or less. Further, in order to adjust the refractive index, $Ga_2O_3$ and $In_2O_3$ may be used in an amount up to approximately 10% each. Nevertheless, the use of these causes a possibility that the devitrification resistance becomes poor. Thus, it is preferable that these are not used in an excessive amount.

In addition to the above-mentioned components, $Sb_2O_3$ and $SnO_2$ may be used which are generally used as fining agents. Here, it is preferable that the amount of $Sb_2O_3$ and $SnO_2$ is 0% or more and 2% or less each. Nevertheless, $As_2O_3$ having a strong effect as a fining agent is toxic. Thus, it is preferable that $As_2O_3$ is not used.

In addition, as for Pb and its compounds, compounds including Te, Se, or Cd, as well as radioactive substances such as compounds including U or Th, it is preferable that they are not used from the viewpoint of safety. Further, it is also preferable that substances such as compounds including Cu, Cr, V, Fe, Ni or Co that cause coloring are not used.

When the individual components are adjusted into the above-mentioned ratios, a high refractive index-lower to middle dispersion type optical glass composition is obtained that has a refractive index (nd) to the d-line of 1.83 or higher and 1.87 or lower and an Abbe number (vd) to the d-line of 43 or higher and 47 or lower, and yet has a liquidus temperature of 1300° C. or lower.

Here, when the glass is handled in a softened or molten state, from the viewpoints of melting property, processability (droplet property), crystallinity and the like, a lower liquidus temperature is generally preferable in the optical glass. Accordingly, as mentioned above, the optical glass composition according to the present Embodiment II-1 has a liquidus temperature of 1300° C. or lower and, preferably, 1295° C. or lower.

(Embodiment II-2)

Next, a preform according to Embodiment II-2 of the present invention and a producing method for the same are described below in detail. The preform is softened by heating so as to be used at least for press molding. Thus, the weight and the shape of the preform are determined appropriately in accordance with the size and the shape of a press molded article serving as a final target. The preform according to the present Embodiment II-2 is formed from the optical glass composition according to the above-mentioned Embodiment II-1, and hence obtained without losing various features of the optical glass composition in Embodiment II-1.

The preform produced from the optical glass composition according to Embodiment II-1 is described below. Here, the preform is a preliminary glass form that is heated and used for precision press molding. The preforms are divided into a gob preform produced by forming a molten glass material and a polished preform produced by physically polishing a glass material. The optical glass composition according to Embodiment II-1 can be used for both of the gob preform and the polished preform.

The producing method for the preform is described below. First, glass raw materials (the above-mentioned individual components) for the optical glass composition according to the above-mentioned Embodiment II-1 are weighed and prepared, and then processed in processing steps such as dissolution, defoaming, fining and homogenization so that homogeneous molten glass is obtained which contains no foreign substances therein. Then, at the time when the molten glass is caused to flow out through an outflow pipe (referred to as a nozzle, hereinafter) made of platinum alloy or the like, a temperature condition for the vicinity of the nozzle is set up strictly into a range of not causing devitrification in the glass. The molten glass flowing out is cast into a receiving die having a receiving surface of planar shape, concave shape, convex shape or the like or into a molding die in which an enclosure is provided in the circumference of a planar surface, a concave surface or a convex surface. As a result, the molten glass is formed into a desired shape. In the following description, preferable forming methods are illustrated.

A first forming method is one example of producing methods for the gob preform. First, a molten glass lump having a weight corresponding to a final molded article or alternatively a desired weight including an addition necessary for secondary processing into a final molded article is dropped into each of a plurality of receiving dies arranged under the nozzle. Then, cooling is performed simultaneously to the forming of glass lumps so that gob preforms are obtained.

A second forming method is another example of producing methods for the gob preform. The second forming method is suitable for a case that a preform having a relatively heavy weight is to be produced. First, the tip of the molten glass flowing out through the nozzle is brought into contact with the receiving die surface. Then, at each time when a desired weight is reached, the receiving die is rapidly separated from the molten glass so that the molten glass is cut off. As a result, the forming of glass free from striae and shear marks is achieved. Further, when necessary, press molding may be performed with aiming simultaneously at cooling of the molten glass lump, so that a desired shape may be imparted and gob preforms are obtained.

A third forming method is one example of producing methods for the polished preform. First, a glass lump having a desired shape is produced by a similar method to the first and the second forming methods. At this time, the glass lump having a desired shape has a total weight of a desired weight plus an additional weight necessary for finishing all the surfaces including optically functional surfaces of a final product (such as a lens) by means of machining. Then, the glass lump having a desired shape is cut and polished by means of machining so that polished preforms are obtained.

The preform obtained by each of the first and the second forming methods described above can be used as a preform for press molding directly in precision press molding. Further, the third forming method provides a preform for polish. In order that breakage should be avoided in the preform at the time of handling, for example, a three-dimensional cooling method, an optimal cooling rate, an annealing treatment and the like may be selected depending on the shape and the weight.

As described above, a preform for press molding and a preform for polish having a desired weight can be obtained from the optical glass composition according to Embodiment II-1. In the case of a preform for press molding, for the purpose of mold release at the time of forming, it is preferable that the surface roughness of the receiving die surface is adjusted or alternatively that a mold-release film is formed. In the case of a preform for polish, when an HBN (boron-containing mold-releasing agent) is applied, releasing from the die becomes easier. Thus, this approach is preferable.

(Embodiment II-3)

Next, an optical element according to Embodiment II-3 of the present invention is described below. The optical element according to Embodiment II-3 has optical indices determined by the composition of the optical glass composition according to the above-mentioned Embodiment II-1. That is, the refractive index (nd) to the d-line is 1.83 to 1.87, while the Abbe number (vd) to the d-line is 43 to 47, and while the liquidus temperature is 1300° C. or lower. Further, this optical element has also a feature that optical absorption by coloring is low in a visible light range. The optical element employing the optical glass composition according to Embodiment II-1 is an optical element suitable for an optical system in a digital camera, a video camera, a mobile device or the like.

Examples of the optical element according to the present Embodiment II-3 include a spherical lens, an aspheric lens and a micro lens, as well as a prism and a diffraction grating. Other examples include an optical element cemented with an optical element composed of a glass material or an optical material of another kind.

Next, a producing method for the optical element according to Embodiment II-3 is described below. The optical element according to Embodiment II-3 can be produced by supplying the preform according to the above-mentioned Embodiment II-2 into a molding die, then softening it by heating, then performing press molding, and then performing polish when necessary.

Press molding methods employable for obtaining the optical element are divided into two typical methods. These methods are selected depending on the means of forming optically functional surfaces where light enters and exits.

First means is means referred to as precision press molding. The molding surfaces of a press molding die are precisely processed in advance into reversal shapes of the optically functional surfaces of the optical element serving as a final molded article. Then, when necessary, a mold-release film is provided in order to avoid fusion between the preform and the molding die. Then, press molding is performed so that the shape of the above-mentioned molding surface is precisely transferred to the preform for press molding having been softened by heating. According to this means, grinding and polishing of optically functional surfaces are unnecessary. That is, the optical element can be produced solely by press molding. The press molding is performed in an inert atmosphere like in nitrogen gas. Here, when a preform for press molding having an additional weight relative to the final molded article is used, for example, in the case of a lens, centering may be performed by grinding by the amount corresponding to the additional weight.

Second means is that press molding is performed using a preform for polish having a shape which is similar to the shape of the optical element serving as a final molded article and which is larger than the optical element. The formed press molded article contains optically functional surfaces, and the surfaces of the optical element are formed by machining. In the press molded article, in order that breakage that could be caused by the machining should be avoided in the glass, residual strain need be minimized. Further, also in order that required optical indices should be achieved, an appropriate annealing treatment is necessary. According to this means, press molding may be performed in an ordinary atmosphere. Further, the above-mentioned mold-releasing agent may be used.

Here, in both cases regardless of whether the first means or the second means described above is selected, the refractive index (nd) and the Abbe number (vd) of the obtained optical element varies slightly owing to the heat history in the producing process. Thus, when an optical element having precisely specified optical indices is to be produced, component adjustment for the optical glass composition, heat history adjustment in the producing process, adjustment of incorporating the amount of variation into the optical design when necessary, or the like may be selected appropriately with taking into consideration the above-mentioned variation in the refractive index (nd) and the Abbe number (vd). As a result, an optical element is obtained that has desired optical indices and an excellent transmissivity and that is particularly suitable as an optical component of a device which incorporates a solid-state image sensor or the like.

(Embodiment III-1)

First, an optical glass composition according to Embodiment III-1 of the present invention is described below in detail. This optical glass composition has the following composition.

That is, the optical glass composition according to the present Embodiment III-1 contains, in % by mole, 5.0% or more and 25.0% or less of $SiO_2$, 20.0% or more and 40.0% or less of $B_2O_3$, 0% or more and 15.0% or less of ZnO, 0% or more and 5.0% or less of $ZrO_2$, 10.0% or more and 25.0% or less of $La_2O_3$, 0% or more and 5.0% or less of $Ta_2O_5$ and 5.0% or more and 20.0% or less of $Gd_2O_3$, and in this optical glass composition, $SiO_2/B_2O_3$ is, in molar ratio, 0.25 or more and 0.90 or less. Also, this optical glass composition substantially contains no $Li_2O$. From this optical glass composition, more stable high refractive index-lower to middle dispersion type optical glass is obtained that has a refractive index (nd) to the d-line of 1.83 or higher and 1.87 or lower and an Abbe number (vd) to the d-line of 43 or higher and 47 or lower, and yet has a liquidus temperature of 1300° C. or lower.

Next, the individual components contained in the optical glass composition are described below in detail. Hereinafter, the contents of the individual components are expressed in % by mole.

$SiO_2$ serves as a component for composing a network, and is an essential component for improving devitrification resistance. Nevertheless, when the amount of $SiO_2$ exceeds 25.0%, its solubility becomes poor, and hence difficulty arises in stable preparing. Further, its liquidus temperature goes high, and hence difficulty arises in preparing. In contrast, when the amount of $SiO_2$ is less than 5.0%, the devitrification resistance becomes poor, and hence the glass becomes unstable. A preferable amount of $SiO_2$ is 8.0% or more and 23.0% or less.

$B_2O_3$ serves as a component for composing a network, and has the effect of lowering a temperature range necessary for ensuring a desired melting property and a desired viscous flow. Nevertheless, when the amount of $B_2O_3$ exceeds 40.0%, the refractive index becomes excessively low. In contrast, when the amount of $B_2O_3$ is less than 20.0%, the temperature range necessary for ensuring a desired melting property and a desired fluidity becomes excessively high. A preferable amount of $B_2O_3$ is 26.0% or more and 39.0% or less.

ZnO has the effects of improving the devitrification resistance and lowering the temperature necessary for viscous flow. Nevertheless, when an excessive amount of ZnO is used, difficulty arises in adjusting the refractive index (nd) and the Abbe number (vd) into desired ranges. The amount of ZnO is 0% or more and 15.0% or less and, preferably, 0% or more and 14.5% or less. Here, in order that the effects of improving the devitrification resistance and lowering the temperature necessary for viscous flow should be achieved more successfully, it is preferable that the amount of ZnO is 1.0% or more.

$ZrO_2$ has the effects of improving the refractive index and also improving the devitrification resistance. Nevertheless, when an excessive amount of $ZrO_2$ is used, the devitrification resistance becomes poor and so does the solubility. The amount of $ZrO_2$ is 0% or more and 5.0% or less, preferably, 0% or more and 3.0% or less. Here, in order that the effects of improving the refractive index and also improving the devitrification resistance should be achieved more successfully, it is preferable that the amount of $ZrO_2$ is 1.0% or more.

$La_2O_3$ improves the refractive index, and is one of the most important components that control the Abbe number. When the amount of $La_2O_3$ is less than 10.0%, difficulty arises in adjusting the Abbe number into a desired range. In contrast, when the amount of $La_2O_3$ exceeds 25.0%, the devitrification resistance becomes poor. Thus, glass becomes unstable, and hence difficulty arises in preparing. A preferable amount of $La_2O_3$ is 11.0% or more and 22.0% or less.

Similarly to $La_2O_3$, $Ta_2O_5$ improves the refractive index, and is one of the components that control the Abbe number. Nevertheless, when an excessive amount of $Ta_2O_5$ is used, the melting property becomes poor, and hence difficulty arises in preparing. Thus, the amount of $Ta_2O_5$ is set to be 0% or more and 5.0% or less and, preferably, 0% or more and 4.0% or less. Here, in order that the effect of improving the refractive index should be achieved more successfully, it is preferable that the amount of $Ta_2O_5$ is 1.0% or more.

Similarly to $La_2O_3$, $Gd_2O_3$ improves the refractive index, and is one of the components that control the Abbe number. Nevertheless, when the amount of $Gd_2O_3$ exceeds 20.0%, the devitrification resistance becomes poor. Thus, glass becomes unstable, and hence difficulty arises in preparing. In contrast, the amount of $Gd_2O_3$ is less than 5.0%, the effect of improving the refractive index becomes insufficient. A preferable amount of $Gd_2O_3$ is 9.0% or more and 19.0% or less.

Here, in order to prevent the devitrification resistance from becoming poor, the molar ratio of $SiO_2$ to $B_2O_3$, that is "$SiO_2/B_2O_3$", is adjusted into 0.25 or more, preferably, into 0.27 or more. Also, in order to adjust the liquidus temperature into a desired range and to prevent the devitrification resistance from becoming poor, the molar ratio is adjusted into 0.90 or less, preferably, into 0.80 or less.

$Li_2O$ has the effect of lowering Tg so as to improve the melting property. Nevertheless, $Li_2O$ prevents the liquidus temperature from lowering, and degrades the devitrification resistance and the refractive index. Accordingly, the optical glass composition according to the present Embodiment III-1 does not contain $Li_2O$ substantially.

Similarly to $Li_2O$, $K_2O$ and $Na_2O$ have the effect of lowering Tg so as to improve the melting property. Nevertheless, the use of $K_2O$ and $Na_2O$ causes a possibility that remarkable degradation of the devitrification resistance and the refractive index is accelerated. Thus, when $K_2O$ and $Na_2O$ need be used, the amount of each is set to be 0% or more and 6.0% or less.

$GeO_2$ may be used as a replacement of $SiO_2$, and serves as a component for composing a network. Nevertheless, when an excessive amount of $GeO_2$ is used, this causes a possibility that the devitrification resistance becomes poor. Thus, it is preferable that the amount of $GeO_2$ is 0% or more and 16.0% or less and, more preferably, 0% or more and 8.0% or less.

BaO is a component that improves preparing property, and may be used within a range of 0% or more and 6.0% or less. Here, alkaline earth metal oxides R'O (here, R' is at least one of Sr, Ca and Mg) other than the BaO have a tendency that when an excessive amount is used, the devitrification resistance becomes poor. Thus, non-use of these is preferable. Accordingly, when the use of R'O is unavoidable, it is preferable that their total amount is set to be 10.0% or less.

Similarly to $La_2O_3$, $Nb_2O_5$ improves the refractive index, and is one of the components that control the Abbe number. Further, when $La_2O_3$ is replaced by $Nb_2O_5$, the effect of improving the devitrification resistance is also obtained. Nevertheless, when an excessive amount of $Nb_2O_5$ is used, difficulty arises in adjusting the Abbe number into a desired range. Thus, the amount of $Nb_2O_5$ is set to be 0% or more and 3.0% or less and, preferably, 0% or more and 2.0% or less. Here, in order that the effect of improving the refractive index and the devitrification resistance should be achieved more successfully, it is preferable that the amount of $Nb_2O_5$ is 0.5% or more.

$TiO_2$ has the effects of controlling the refractive index and the Abbe number and improving the devitrification resistance. Nevertheless, when an excessive amount of $TiO_2$ is used, difficulty arises in adjusting the Abbe number into a desired range. Thus, the amount of $TiO_2$ is set to be 0% or more and 3.0% or less and, preferably, 0% or more and 2.0% or less. Here, in order that the effect of improving the refractive index and the devitrification resistance should be achieved more successfully, it is preferable that the amount of $TiO_2$ is 0.5% or more.

Similarly to $La_2O_3$, $Y_2O_3$ and $Yb_2O_3$ improve the refractive index, and are components that control the Abbe number. Nevertheless, when an excessive amount of these $Y_2O_3$ and $Yb_2O_3$ is used, the devitrification resistance becomes poor. Thus, glass becomes unstable, and hence difficulty arises in preparing. Thus, when $La_2O_3$ need be replaced by these $Y_2O_3$ and $Yb_2O_3$, it is preferable that the amount of each is set to be 0% or more and 3.0% or less.

$WO_3$ is a component for alleviating the high devitrification caused by $La_2O_3$ and adjusting the refractive index and the Abbe number into desired ranges. Nevertheless, when an excessive amount of $WO_3$ is used, this causes a possibility that the transmissivity in a blue light range becomes poor. Thus, the amount of $WO_3$ is 0% or more and 3.0% or less and, preferably, 0% or more and 2.0% or less. Here, in order that the effects of alleviating the high devitrification caused by $La_2O_3$ and adjusting the refractive index and the Abbe number into desired ranges should be achieved more successfully, it is preferable that the amount of $WO_3$ is 0.5% or more.

$Al_2O_3$ may be used for adjusting the refractive index. However, it is preferable that the amount is 0% or more and 10% or less. Further, in order to adjust the refractive index, $Ga_2O_3$ and $In_2O_3$ may be used in an amount up to approximately 10% each. Nevertheless, the use of these causes a possibility that the devitrification resistance becomes poor. Thus, it is preferable that these are not used in an excessive amount.

In addition to the above-mentioned components, $Sb_2O_3$ and $SnO_2$ may be used which are generally used as fining agents. Here, it is preferable that the amount of $Sb_2O_3$ and $SnO_2$ is 0% or more and 2% or less each. Nevertheless, $As_2O_3$ having a strong effect as a fining agent is toxic. Thus, it is preferable that $As_2O_3$ is not used.

In addition, as for Pb and its compounds, compounds including Te, Se, or Cd, as well as radioactive substances such as compounds including U or Th, it is preferable that they are not used from the viewpoint of safety. Further, it is also preferable that substances such as compounds including Cu, Cr, V, Fe, Ni or Co that cause coloring are not used.

When the individual components are adjusted into the above-mentioned ratios, a high refractive index-lower to middle dispersion type optical glass composition is obtained that has a refractive index (nd) to the d-line of 1.83 or higher and 1.87 or lower and an Abbe number (vd) to the d-line of 43 or higher and 47 or lower, and yet has a liquidus temperature of 1300° C. or lower.

Here, when the glass is handled in a softened or molten state, from the viewpoints of melting property, processability (droplet property), crystallinity and the like, a lower liquidus temperature is generally preferable in the optical glass. Accordingly, as mentioned above, the optical glass composition according to the present Embodiment III-1 has a liquidus temperature of 1300° C. or lower and, preferably, 1295° C. or lower.

(Embodiment III-2)

Next, a preform according to Embodiment III-2 of the present invention and a producing method for the same are described below in detail. The preform is softened by heating so as to be used at least for press molding. Thus, the weight and the shape of the preform are determined appropriately in accordance with the size and the shape of a press molded article serving as a final target. The preform according to the present Embodiment III-2 is formed from the optical glass composition according to the above-mentioned Embodiment III-1, and hence obtained without losing various features of the optical glass composition in Embodiment III-1.

The preform produced from the optical glass composition according to Embodiment III-1 is described below. Here, the preform is a preliminary glass form that is heated and used for precision press molding. The preforms are divided into a gob preform produced by forming a molten glass material and a polished preform produced by physically polishing a glass material. The optical glass composition according to Embodiment III-1 can be used for both of the gob preform and the polished preform.

The producing method for the preform is described below. First, glass raw materials (the above-mentioned individual components) for the optical glass composition according to the above-mentioned Embodiment III-1 are weighed and prepared, and then processed in processing steps such as dissolution, defoaming, fining and homogenization so that homogeneous molten glass is obtained which contains no foreign substances therein. Then, at the time when the molten glass is caused to flow out through an outflow pipe (referred to as a nozzle, hereinafter) made of platinum alloy or the like, a temperature condition for the vicinity of the nozzle is set up strictly into a range of not causing devitrification in the glass. The molten glass flowing out is cast into a receiving die having a receiving surface of planar shape, concave shape, convex shape or the like or into a molding die in which an enclosure is provided in the circumference of a planar surface, a concave surface or a convex surface. As a result, the molten glass is formed into a desired shape. In the following description, preferable forming methods are illustrated.

A first forming method is one example of producing methods for the gob preform. First, a molten glass lump having a weight corresponding to a final molded article or alternatively a desired weight including an addition necessary for secondary processing into a final molded article is dropped into each of a plurality of receiving dies arranged under the nozzle. Then, cooling is performed simultaneously to the forming of glass lumps so that gob preforms are obtained.

A second forming method is another example of producing methods for the gob preform. The second forming method is suitable for a case that a preform having a relatively heavy weight is to be produced. First, the tip of the molten glass flowing out through the nozzle is brought into contact with the receiving die surface. Then, at each time when a desired weight is reached, the receiving die is rapidly separated from the molten glass so that the molten glass is cut off. As a result, the forming of glass free from striae and shear marks is achieved. Further, when necessary, press molding may be performed with aiming simultaneously at cooling of the molten glass lump, so that a desired shape may be imparted and gob preforms are obtained.

A third forming method is one example of producing methods for the polished preform. First, a glass lump having a desired shape is produced by a similar method to the first and the second forming methods. At this time, the glass lump having a desired shape has a total weight of a desired weight plus an additional weight necessary for finishing all the surfaces including optically functional surfaces of a final product (such as a lens) by means of machining. Then, the glass lump having a desired shape is cut and polished by means of machining so that polished preforms are obtained.

The preform obtained by each of the first and the second forming methods described above can be used as a preform for press molding directly in precision press molding. Further, the third forming method provides a preform for polish. In order that breakage should be avoided in the preform at the time of handling, for example, a three-dimensional cooling method, an optimal cooling rate, an annealing treatment and the like may be selected depending on the shape and the weight.

As described above, a preform for press molding and a preform for polish having a desired weight can be obtained from the optical glass composition according to Embodiment III-1. In the case of a preform for press molding, for the purpose of mold release at the time of forming, it is preferable that the surface roughness of the receiving die surface is adjusted or alternatively that a mold-release film is formed. In the case of a preform for polish, when an HBN (boron-containing mold-releasing agent) is applied, releasing from the die becomes easier. Thus, this approach is preferable.

(Embodiment III-3)

Next, an optical element according to Embodiment III-3 of the present invention is described below. The optical element according to Embodiment III-3 has optical indices determined by the composition of the optical glass composition according to the above-mentioned Embodiment III-1. That is, the refractive index (nd) to the d-line is 1.83 to 1.87, while the Abbe number (vd) to the d-line is 43 to 47, and while the liquidus temperature is 1300° C. or lower. Further, this optical element has also a feature that optical absorption by coloring is low in a visible light range. The optical element employing the optical glass composition according to Embodiment III-1 is an optical element suitable for an optical system in a digital camera, a video camera, a mobile device or the like.

Examples of the optical element according to the present Embodiment III-3 include a spherical lens, an aspheric lens and a micro lens, as well as a prism and a diffraction grating. Other examples include an optical element cemented with an optical element composed of a glass material or an optical material of another kind.

Next, a producing method for the optical element according to Embodiment III-3 is described below. The optical element according to Embodiment III-3 can be produced by supplying the preform according to the above-mentioned Embodiment III-2 into a molding die, then softening it by heating, then performing press molding, and then performing polish when necessary.

Press molding methods employable for obtaining the optical element are divided into two typical methods. These methods are selected depending on the means of forming optically functional surfaces where light enters and exits.

First means is means referred to as precision press molding. The molding surfaces of a press molding die are precisely processed in advance into reversal shapes of the optically functional surfaces of the optical element serving as a final molded article. Then, when necessary, a mold-release film is provided in order to avoid fusion between the preform and the molding die. Then, press molding is performed so that the shape of the above-mentioned molding surface is precisely transferred to the preform for press molding having been softened by heating. According to this means, grinding and polishing of optically functional surfaces are unnecessary. That is, the optical element can be produced solely by press molding. The press molding is performed in an inert atmosphere like in nitrogen gas. Here, when a preform for press molding having an additional weight relative to the final molded article is used, for example, in the case of a lens, centering may be performed by grinding by the amount corresponding to the additional weight.

Second means is that press molding is performed using a preform for polish having a shape which is similar to the shape of the optical element serving as a final molded article and which is larger than the optical element. The formed press molded article contains optically functional surfaces, and the surfaces of the optical element are formed by machining. In the press molded article, in order that breakage that could be caused by the machining should be avoided in the glass, residual strain need be minimized. Further, also in order that required optical indices should be achieved, an appropriate annealing treatment is necessary. According to this means, press molding may be performed in an ordinary atmosphere. Further, the above-mentioned mold-releasing agent may be used.

Here, in both cases regardless of whether the first means or the second means described above is selected, the refractive index (nd) and the Abbe number (vd) of the obtained optical element varies slightly owing to the heat history in the producing process. Thus, when an optical element having precisely specified optical indices is to be produced, component adjustment for the optical glass composition, heat history adjustment in the producing process, adjustment of incorporating the amount of variation into the optical design when necessary, or the like may be selected appropriately with taking into consideration the above-mentioned variation in the refractive index (nd) and the Abbe number (vd). As a result, an optical element is obtained that has desired optical indices and an excellent transmissivity and that is particularly suitable as an optical component of a device which incorporates a solid-state image sensor or the like.

(Embodiment IV-1)

First, an optical glass composition according to Embodiment IV-1 of the present invention is described below in detail. This optical glass composition has the following composition.

That is, the optical glass composition according to the present Embodiment IV-1 contains, in % by mole, 0% or more and 10.0% or less of $SiO_2$, 30.0% or more and 45.0% or less of $B_2O_3$, 0% or more and 5.0% or less of $Li_2O$, 0% or more and 12.0% or less of ZnO, 0% or more and 10.0% or less of $ZrO_2$, 10.0% or more and 20.0% or less of $La_2O_3$, 3.0% or more and 10.0% or less of $Ta_2O_5$, 11.0% or more and 20.0% or less of $Ta_2O_5+ZrO_2$ and 5.0% or more and 20.0% or less of $Gd_2O_3$. From this optical glass composition, more stable high refractive index-lower to middle dispersion type optical glass is obtained that has a refractive index (nd) to the d-line of 1.83 or higher and 1.86 or lower and an Abbe number (vd) to the d-line of 43 or higher and 45 or lower, and yet has a liquidus temperature of 1200° C. or lower.

Next, the individual components contained in the optical glass composition are described below in detail. Hereinafter, the contents of the individual components are expressed in % by mole.

$SiO_2$ serves as a component for composing a network, and is a component for improving devitrification resistance. Nevertheless, when an excessive amount of $SiO_2$ is used, its solubility becomes poor, and hence difficulty arises in stable preparing. Thus, the amount of $SiO_2$ is set to be 0% or more and 10.0% or less and, preferably, 0% or more and 9.5% or less. Here, in order to prevent the devitrification resistance from becoming poor and the glass from becoming unstable, it is preferable that the amount of $SiO_2$ is 7.0% or more.

$B_2O_3$ serves as a component for composing a network, and has the effect of lowering a temperature range necessary for ensuring a desired melting property and a desired viscous flow. Nevertheless, when the amount of $B_2O_3$ exceeds 45.0%, the refractive index becomes excessively low. In contrast, when the amount of $B_2O_3$ is less than 30.0%, the temperature range necessary for ensuring a desired melting property and a desired fluidity becomes excessively high. A preferable amount of $B_2O_3$ is 40.0% or more and 44.0% or less.

$Li_2O$ has the effect of lowering Tg so as to improve the melting property. Nevertheless, when an excessive amount of $Li_2O$ is used, remarkable degradation arises in the devitrification resistance and the refractive index. Thus, the amount of $Li_2O$ is set to be 0% or more and 5.0% or less and, preferably, 0% or more and 3.0% or less. Here, in order that Tg should be lowered so that the effect of improving the melting property should be achieved more successfully, it is preferable that the amount of $Li_2O$ is 0.5% or more.

Similarly to $Li_2O$, $K_2O$ and $Na_2O$ have the effect of lowering Tg so as to improve the melting property. Nevertheless, the use of $K_2O$ and $Na_2O$ causes a possibility that remarkable degradation of the devitrification resistance and the refractive index is accelerated. Thus, when $K_2O$ and $Na_2O$ need be used, the amount of each is set to be 0% or more and 6.0% or less.

ZnO has the effects of improving the devitrification resistance and lowering the temperature necessary for viscous flow. Nevertheless, when an excessive amount of ZnO is used, difficulty arises in adjusting the refractive index (nd) and the Abbe number (vd) into desired ranges. The amount of ZnO is 0% or more and 12.0% or less. Here, in order that the effects of improving the devitrification resistance and lowering the temperature necessary for viscous flow should be achieved more successfully, it is preferable that the amount of ZnO is 1.0% or more.

$ZrO_2$ has the effects of improving the refractive index and also improving the devitrification resistance. Nevertheless, when an excessive amount of $ZrO_2$ is used, the devitrification resistance becomes poor and so does the solubility. The amount of $ZrO_2$ is 0% or more and 10.0% or less. Here, in order that the effects of improving the refractive index and also improving the devitrification resistance should be achieved more successfully, it is preferable that the amount of $ZrO_2$ is 1.0% or more.

$La_2O_3$ improves the refractive index, and is one of the most important components that control the Abbe number. When the amount of $La_2O_3$ is less than 10.0%, difficulty arises in adjusting the Abbe number into a desired range. In contrast, when the amount of $La_2O_3$ exceeds 20.0%, the devitrification resistance becomes poor. Thus, glass becomes unstable, and hence difficulty arises in preparing. A preferable amount of $La_2O_3$ is 11.0% or more and 19.0% or less.

Similarly to $La_2O_3$, $Ta_2O_5$ improves the refractive index, and is one of the components that control the Abbe number. Also, $Ta_2O_5$ is one of the components that decrease the liquidus temperature to a desired range. Nevertheless, when the amount of $Ta_2O_5$ exceeds 10.0%, the melting property becomes poor, and hence difficulty arises in preparing. In contrast, when the amount of $Ta_2O_5$ is less than 3.0%, the effects of improving the refractive index and decreasing the liquidus temperature become insufficient. A preferable amount of $Ta_2O_5$ is 5.0% or more and 7.0% or less.

Here, in order that the refractive index should be increased to a desired range and the liquidus temperature should be decreased to a desired range, the total amount of $Ta_2O_5$ and $ZrO_2$ ($Ta_2O_5+ZrO_2$) is adjusted into 11.0% or more. Here, when the total amount is excessive, the devitrification resistance becomes poor. Thus, the total amount is adjusted into 20.0% or less, preferably, into 15.0% or less.

Similarly to $La_2O_3$, $Gd_2O_3$ improves the refractive index, and is one of the components that control the Abbe number. Nevertheless, when the amount of $Gd_2O_3$ exceeds 20.0%, the devitrification resistance becomes poor. Thus, glass becomes unstable, and hence difficulty arises in preparing. In contrast, the amount of $Gd_2O_3$ is less than 5.0%, the effect of improving the refractive index becomes insufficient. A preferable amount of $Gd_2O_3$ is 8.0% or more and 17.0% or less.

$GeO_2$ may be used as a replacement of $SiO_2$, and serves as a component for composing a network. Nevertheless, when an excessive amount of $GeO_2$ is used, this causes a possibility that the devitrification resistance becomes poor. Thus, it is preferable that the amount of $GeO_2$ is 0% or more and 16.0% or less and, more preferably, 0% or more and 8.0% or less.

BaO is a component that improves preparing property, and may be used within a range of 0% or more and 10.0% or less. Here, alkaline earth metal oxides R'O (here, R' is at least one of Sr, Ca and Mg) other than the BaO have a tendency that when an excessive amount is used, the devitrification resistance becomes poor. Thus, non-use of these is preferable.

Accordingly, when the use of R'O is unavoidable, it is preferable that their total amount is set to be 15.0% or less.

Similarly to $La_2O_3$, $Nb_2O_5$ improves the refractive index, and is one of the components that control the Abbe number. Further, when $La_2O_3$ is replaced by $Nb_2O_5$, the effect of improving the devitrification resistance is also obtained. Nevertheless, when an excessive amount of $Nb_2O_5$ is used, difficulty arises in adjusting the Abbe number into a desired range. Thus, the amount of $Nb_2O_5$ is set to be 0% or more and 3.0% or less and, preferably, 0% or more and 2.0% or less. Here, in order that the effect of improving the refractive index and the devitrification resistance should be achieved more successfully, it is preferable that the amount of $Nb_2O_5$ is 0.5% or more.

$TiO_2$ has the effects of controlling the refractive index and the Abbe number and improving the devitrification resistance. Nevertheless, when an excessive amount of $TiO_2$ is used, difficulty arises in adjusting the Abbe number into a desired range. Thus, the amount of $TiO_2$ is set to be 0% or more and 3.0% or less and, preferably, 0% or more and 2.0% or less. Here, in order that the effect of improving the refractive index and the devitrification resistance should be achieved more successfully, it is preferable that the amount of $TiO_2$ is 0.5% or more.

Similarly to $La_2O_3$, $Y_2O_3$ and $Yb_2O_3$ improve the refractive index, and are components that control the Abbe number. Nevertheless, when an excessive amount of these $Y_2O_3$ and $Yb_2O_3$ is used, the devitrification resistance becomes poor. Thus, glass becomes unstable, and hence difficulty arises in preparing. Thus, when $La_2O_3$ need be replaced by these $Y_2O_3$ and $Yb_2O_3$, it is preferable that the amount of each is set to be 0% or more and 3.0% or less.

$WO_3$ is a component for alleviating the high devitrification caused by $La_2O_3$ and adjusting the refractive index and the Abbe number into desired ranges. Nevertheless, when an excessive amount of $WO_3$ is used, this causes a possibility that the transmissivity in a blue light range becomes poor. Thus, the amount of $WO_3$ is 0% or more and 3.0% or less and, preferably, 0% or more and 2.0% or less. Here, in order that the effects of alleviating the high devitrification caused by $La_2O_3$ and adjusting the refractive index and the Abbe number into desired ranges should be achieved more successfully, it is preferable that the amount of $WO_3$ is 0.5% or more.

$Al_2O_3$ may be used for adjusting the refractive index. However, it is preferable that the amount is 0% or more and 10% or less. Further, in order to adjust the refractive index, $Ga_2O_3$ and $In_2O_3$ may be used in an amount up to approximately 10% each. Nevertheless, the use of these causes a possibility that the devitrification resistance becomes poor. Thus, it is preferable that these are not used in an excessive amount.

In addition to the above-mentioned components, $Sb_2O_3$ and $SnO_2$ may be used which are generally used as fining agents. Here, it is preferable that the amount of $Sb_2O_3$ and $SnO_2$ is 0% or more and 2% or less each. Nevertheless, $As_2O_3$ having a strong effect as a fining agent is toxic. Thus, it is preferable that $As_2O_3$ is not used.

In addition, as for Pb and its compounds, compounds including Te, Se, or Cd, as well as radioactive substances such as compounds including U or Th, it is preferable that they are not used from the viewpoint of safety. Further, it is also preferable that substances such as compounds including Cu, Cr, V, Fe, Ni or Co that cause coloring are not used.

When the individual components are adjusted into the above-mentioned ratios, a high refractive index-lower to middle dispersion type optical glass composition is obtained that has a refractive index (nd) to the d-line of 1.83 or higher and 1.86 or lower and an Abbe number (vd) to the d-line of 43 or higher and 45 or lower, and yet has a liquidus temperature of 1200° C. or lower.

Here, when the glass is handled in a softened or molten state, from the viewpoints of melting property, processability (droplet property), crystallinity and the like, a lower liquidus temperature is generally preferable in the optical glass. Accordingly, as mentioned above, the optical glass composition according to the present Embodiment IV-1 has a liquidus temperature of 1200° C. or lower and, preferably, 1190° C. or lower.

(Embodiment IV-2)

Next, a preform according to Embodiment IV-2 of the present invention and a producing method for the same are described below in detail. The preform is softened by heating so as to be used at least for press molding. Thus, the weight and the shape of the preform are determined appropriately in accordance with the size and the shape of a press molded article serving as a final target. The preform according to the present Embodiment IV-2 is formed from the optical glass composition according to the above-mentioned Embodiment IV-1, and hence obtained without losing various features of the optical glass composition in Embodiment IV-1.

The preform produced from the optical glass composition according to Embodiment IV-1 is described below. Here, the preform is a preliminary glass form that is heated and used for precision press molding. The preforms are divided into a gob preform produced by forming a molten glass material and a polished preform produced by physically polishing a glass material. The optical glass composition according to Embodiment IV-1 can be used for both of the gob preform and the polished preform.

The producing method for the preform is described below. First, glass raw materials (the above-mentioned individual components) for the optical glass composition according to the above-mentioned Embodiment IV-1 are weighed and prepared, and then processed in processing steps such as dissolution, defoaming, fining and homogenization so that homogeneous molten glass is obtained which contains no foreign substances therein. Then, at the time when the molten glass is caused to flow out through an outflow pipe (referred to as a nozzle, hereinafter) made of platinum alloy or the like, a temperature condition for the vicinity of the nozzle is set up strictly into a range of not causing devitrification in the glass. The molten glass flowing out is cast into a receiving die having a receiving surface of planar shape, concave shape, convex shape or the like or into a molding die in which an enclosure is provided in the circumference of a planar surface, a concave surface or a convex surface. As a result, the molten glass is formed into a desired shape. In the following description, preferable forming methods are illustrated.

A first forming method is one example of producing methods for the gob preform. First, a molten glass lump having a weight corresponding to a final molded article or alternatively a desired weight including an addition necessary for secondary processing into a final molded article is dropped into each of a plurality of receiving dies arranged under the nozzle. Then, cooling is performed simultaneously to the forming of glass lumps so that gob preforms are obtained.

A second forming method is another example of producing methods for the gob preform. The second forming method is suitable for a case that a preform having a relatively heavy weight is to be produced. First, the tip of the molten glass flowing out through the nozzle is brought into contact with the receiving die surface. Then, at each time when a desired weight is reached, the receiving die is rapidly separated from the molten glass so that the molten glass is cut off. As a result, the forming of glass free from striae and shear marks is achieved. Further, when necessary, press molding may be performed with aiming simultaneously at cooling of the molten glass lump, so that a desired shape may be imparted and gob preforms are obtained.

A third forming method is one example of producing methods for the polished preform. First, a glass lump having a desired shape is produced by a similar method to the first and the second forming methods. At this time, the glass lump having a desired shape has a total weight of a desired weight plus an additional weight necessary for finishing all the surfaces including optically functional surfaces of a final product (such as a lens) by means of machining. Then, the glass lump having a desired shape is cut and polished by means of machining so that polished preforms are obtained.

The preform obtained by each of the first and the second forming methods described above can be used as a preform for press molding directly in precision press molding. Further, the third forming method provides a preform for polish. In order that breakage should be avoided in the preform at the time of handling, for example, a three-dimensional cooling method, an optimal cooling rate, an annealing treatment and the like may be selected depending on the shape and the weight.

As described above, a preform for press molding and a preform for polish having a desired weight can be obtained from the optical glass composition according to Embodiment IV-1. In the case of a preform for press molding, for the purpose of mold release at the time of forming, it is preferable that the surface roughness of the receiving die surface is adjusted or alternatively that a mold-release film is formed. In the case of a preform for polish, when an HBN (boron-containing mold-releasing agent) is applied, releasing from the die becomes easier. Thus, this approach is preferable.

(Embodiment IV-3)

Next, an optical element according to Embodiment IV-3 of the present invention is described below. The optical element according to Embodiment IV-3 has optical indices determined by the composition of the optical glass composition according to the above-mentioned Embodiment IV-1. That is, the refractive index (nd) to the d-line is 1.83 to 1.86, while the Abbe number (vd) to the d-line is 43 to 45, and while the liquidus temperature is 1200° C. or lower. Further, this optical element has also a feature that optical absorption by coloring is low in a visible light range. The optical element employing the optical glass composition according to Embodiment IV-1 is an optical element suitable for an optical system in a digital camera, a video camera, a mobile device or the like.

Examples of the optical element according to the present Embodiment IV-3 include a spherical lens, an aspheric lens and a micro lens, as well as a prism and a diffraction grating. Other examples include an optical element cemented with an optical element composed of a glass material or an optical material of another kind.

Next, a producing method for the optical element according to Embodiment IV-3 is described below. The optical element according to Embodiment IV-3 can be produced by supplying the preform according to the above-mentioned Embodiment W-2 into a molding die, then softening it by heating, then performing press molding, and then performing polish when necessary.

Press molding methods employable for obtaining the optical element are divided into two typical methods. These methods are selected depending on the means of forming optically functional surfaces where light enters and exits.

First means is means referred to as precision press molding. The molding surfaces of a press molding die are precisely processed in advance into reversal shapes of the optically functional surfaces of the optical element serving as a final molded article. Then, when necessary, a mold-release film is provided in order to avoid fusion between the preform and the molding die. Then, press molding is performed so that the shape of the above-mentioned molding surface is precisely transferred to the preform for press molding having been softened by heating. According to this means, grinding and polishing of optically functional surfaces are unnecessary. That is, the optical element can be produced solely by press molding. The press molding is performed in an inert atmosphere like in nitrogen gas. Here, when a preform for press molding having an additional weight relative to the final molded article is used, for example, in the case of a lens, centering may be performed by grinding by the amount corresponding to the additional weight.

Second means is that press molding is performed using a preform for polish having a shape which is similar to the shape of the optical element serving as a final molded article and which is larger than the optical element. The formed press molded article contains optically functional surfaces, and the surfaces of the optical element are formed by machining. In the press molded article, in order that breakage that could be caused by the machining should be avoided in the glass, residual strain need be minimized. Further, also in order that required optical indices should be achieved, an appropriate annealing treatment is necessary. According to this means, press molding may be performed in an ordinary atmosphere. Further, the above-mentioned mold-releasing agent may be used.

Here, in both cases regardless of whether the first means or the second means described above is selected, the refractive index (nd) and the Abbe number (vd) of the obtained optical element varies slightly owing to the heat history in the producing process. Thus, when an optical element having precisely specified optical indices is to be produced, component adjustment for the optical glass composition, heat history adjustment in the producing process, adjustment of incorporating the amount of variation into the optical design when necessary, or the like may be selected appropriately with taking into consideration the above-mentioned variation in the refractive index (nd) and the Abbe number (vd). As a result, an optical element is obtained that has desired optical indices and an excellent transmissivity and that is particularly suitable as an optical component of a device which incorporates a solid-state image sensor or the like.

(Embodiment V-1)

First, an optical glass composition according to Embodiment V-1 of the present invention is described below in detail. This optical glass composition has the following composition.

That is, the optical glass composition according to the present Embodiment V-1 contains, in % by mole, 0% or more and 10.0% or less of $SiO_2$, 35.0% or more and 45.0% or less of $B_2O_3$, 0% or more and 5.0% or less of $Li_2O$, 0% or more and 12.0% or less of ZnO, 0% or more and 10.0% or less of $ZrO_2$, 10.0% or more and 20.0% or less of $La_2O_3$, 3.0% or more and 10.0% or less of $Ta_2O_5$, 10.0% or more and 22.0% or less of $Ta_2O_5$+ZnO and 5.0% or more and 20.0% or less of $Gd_2O_3$. From this optical glass composition, more stable high refractive index-lower to middle dispersion type optical glass is obtained that has a refractive index (nd) to the d-line of 1.83 or higher and 1.86 or lower and an Abbe number (vd) to the d-line of 43 or higher and 46 or lower, and yet has a liquidus temperature of 1200° C. or lower.

Next, the individual components contained in the optical glass composition are described below in detail. Hereinafter, the contents of the individual components are expressed in % by mole.

$SiO_2$ serves as a component for composing a network, and is a component for improving devitrification resistance. Nevertheless, when an excessive amount of $SiO_2$ is used, its solubility becomes poor, and hence difficulty arises in stable preparing. Thus, the amount of $SiO_2$ is set to be 0% or more and 10.0% or less and, preferably, 0% or more and 9.5% or less. Here, in order to prevent the devitrification resistance from becoming poor and the glass from becoming unstable, it is preferable that the amount of $SiO_2$ is 7.0% or more.

$B_2O_3$ serves as a component for composing a network, and has the effect of lowering a temperature range necessary for ensuring a desired melting property and a desired viscous flow. Nevertheless, when the amount of $B_2O_3$ exceeds 45.0%, the refractive index becomes excessively low. In contrast, when the amount of $B_2O_3$ is less than 35.0%, the temperature range necessary for ensuring a desired melting property and a desired fluidity becomes excessively high. A preferable amount of $B_2O_3$ is 40.0% or more and 44.0% or less.

$Li_2O$ has the effect of lowering Tg so as to improve the melting property. Nevertheless, when an excessive amount of $Li_2O$ is used, remarkable degradation arises in the devitrification resistance and the refractive index. Thus, the amount of $Li_2O$ is set to be 0% or more and 5.0% or less and, preferably, 0% or more and 4.0% or less. Here, in order that Tg should be lowered so that the effect of improving the melting property should be achieved more successfully, it is preferable that the amount of $Li_2O$ is 0.5% or more.

Similarly to $Li_2O$, $K_2O$ and $Na_2O$ have the effect of lowering Tg so as to improve the melting property. Nevertheless, the use of $K_2O$ and $Na_2O$ causes a possibility that remarkable degradation of the devitrification resistance and the refractive index is accelerated. Thus, when $K_2O$ and $Na_2O$ need be used, the amount of each is set to be 0% or more and 6.0% or less.

ZnO has the effects of improving the devitrification resistance and lowering the temperature necessary for viscous flow. Nevertheless, when an excessive amount of ZnO is used, difficulty arises in adjusting the refractive index (nd) and the Abbe number (vd) into desired ranges. The amount of ZnO is 0% or more and 12.0% or less. Here, in order that the effects of improving the devitrification resistance and lowering the temperature necessary for viscous flow should be achieved more successfully, it is preferable that the amount of ZnO is 1.0% or more.

$ZrO_2$ has the effects of improving the refractive index and also improving the devitrification resistance. Nevertheless, when an excessive amount of $ZrO_2$ is used, the devitrification resistance becomes poor and so does the solubility. The amount of $ZrO_2$ is 0% or more and 10.0% or less. Here, in order that the effects of improving the refractive index and also improving the devitrification resistance should be achieved more successfully, it is preferable that the amount of $ZrO_2$ is 1.0% or more.

$La_2O_3$ improves the refractive index, and is one of the most important components that control the Abbe number. When the amount of $La_2O_3$ is less than 10.0%, difficulty arises in adjusting the Abbe number into a desired range. In contrast, when the amount of $La_2O_3$ exceeds 20.0%, the devitrification resistance becomes poor. Thus, glass becomes unstable, and hence difficulty arises in preparing. A preferable amount of $La_2O_3$ is 11.0% or more and 19.0% or less.

Similarly to $La_2O_3$, $Ta_2O_5$ improves the refractive index, and is one of the components that control the Abbe number. Also, $Ta_2O_5$ is one of the components that decrease the liquidus temperature to a desired range. Nevertheless, when the amount of $Ta_2O_5$ exceeds 10.0%, the melting property becomes poor, and hence difficulty arises in preparing. In contrast, when the amount of $Ta_2O_5$ is less than 3.0%, the effects of improving the refractive index and decreasing the liquidus temperature become insufficient. A preferable amount of $Ta_2O_5$ is 5.0% or more and 7.0% or less.

Here, in order that the refractive index should be increased to a desired range and the liquidus temperature should be decreased to a desired range, the total amount of $Ta_2O_5$ and $ZnO(Ta_2O_5+ZnO)$ is adjusted into 10.0% or more. Here, when the total amount is excessive, the devitrification resistance becomes poor. Thus, the total amount is adjusted into 22.0% or less, preferably, into 18.0% or less.

Similarly to $La_2O_3$, $Gd_2O_3$ improves the refractive index, and is one of the components that control the Abbe number. Nevertheless, when the amount of $Gd_2O_3$ exceeds 20.0%, the devitrification resistance becomes poor. Thus, glass becomes unstable, and hence difficulty arises in preparing. In contrast, the amount of $Gd_2O_3$ is less than 5.0%, the effect of improving the refractive index becomes insufficient. A preferable amount of $Gd_2O_3$ is 8.0% or more and 17.0% or less.

$GeO_2$ may be used as a replacement of $SiO_2$, and serves as a component for composing a network. Nevertheless, when an excessive amount of $GeO_2$ is used, this causes a possibility that the devitrification resistance becomes poor. Thus, it is preferable that the amount of $GeO_2$ is 0% or more and 16.0% or less and, more preferably, 0% or more and 8.0% or less.

BaO is a component that improves preparing property, and may be used within a range of 0% or more and 10.0% or less. Here, alkaline earth metal oxides R'O (here, R' is at least one of Sr, Ca and Mg) other than the BaO have a tendency that when an excessive amount is used, the devitrification resistance becomes poor. Thus, non-use of these is preferable. Accordingly, when the use of R'O is unavoidable, it is preferable that their total amount is set to be 15.0% or less.

Similarly to $La_2O_3$, $Nb_2O_5$ improves the refractive index, and is one of the components that control the Abbe number. Further, when $La_2O_3$ is replaced by $Nb_2O_5$, the effect of improving the devitrification resistance is also obtained. Nevertheless, when an excessive amount of $Nb_2O_5$ is used, difficulty arises in adjusting the Abbe number into a desired range. Thus, the amount of $Nb_2O_5$ is set to be 0% or more and 3.0% or less and, preferably, 0% or more and 2.0% or less. Here, in order that the effect of improving the refractive index and the devitrification resistance should be achieved more successfully, it is preferable that the amount of $Nb_2O_5$ is 0.5% or more.

$TiO_2$ has the effects of controlling the refractive index and the Abbe number and improving the devitrification resistance. Nevertheless, when an excessive amount of $TiO_2$ is used, difficulty arises in adjusting the Abbe number into a desired range. Thus, the amount of $TiO_2$ is set to be 0% or more and 3.0% or less and, preferably, 0% or more and 2.0% or less. Here, in order that the effect of improving the refractive index and the devitrification resistance should be achieved more successfully, it is preferable that the amount of $TiO_2$ is 0.5% or more.

Similarly to $La_2O_3$, $Y_2O_3$ and $Yb_2O_3$ improve the refractive index, and are components that control the Abbe number. Nevertheless, when an excessive amount of these $Y_2O_3$ and $Yb_2O_3$ is used, the devitrification resistance becomes poor. Thus, glass becomes unstable, and hence difficulty arises in preparing. Thus, when $La_2O_3$ need be replaced by these $Y_2O_3$ and $Yb_2O_3$, it is preferable that the amount of each is set to be 0% or more and 3.0% or less.

WO$_3$ is a component for alleviating the high devitrification caused by La$_2$O$_3$ and adjusting the refractive index and the Abbe number into desired ranges. Nevertheless, when an excessive amount of WO$_3$ is used, this causes a possibility that the transmissivity in a blue light range becomes poor. Thus, the amount of WO$_3$ is 0% or more and 3.0% or less and, preferably, 0% or more and 2.0% or less. Here, in order that the effects of alleviating the high devitrification caused by La$_2$O$_3$ and adjusting the refractive index and the Abbe number into desired ranges should be achieved more successfully, it is preferable that the amount of WO$_3$ is 0.5% or more.

Al$_2$O$_3$ may be used for adjusting the refractive index. However, it is preferable that the amount is 0% or more and 10% or less. Further, in order to adjust the refractive index, Ga$_2$O$_3$ and In$_2$O$_3$ may be used in an amount up to approximately 10% each. Nevertheless, the use of these causes a possibility that the devitrification resistance becomes poor. Thus, it is preferable that these are not used in an excessive amount.

In addition to the above-mentioned components, Sb$_2$O$_3$ and SnO$_2$ may be used which are generally used as fining agents. Here, it is preferable that the amount of Sb$_2$O$_3$ and SnO$_2$ is 0% or more and 2% or less each. Nevertheless, As$_2$O$_3$ having a strong effect as a fining agent is toxic. Thus, it is preferable that As$_2$O$_3$ is not used.

In addition, as for Pb and its compounds, compounds including Te, Se, or Cd, as well as radioactive substances such as compounds including U or Th, it is preferable that they are not used from the viewpoint of safety. Further, it is also preferable that substances such as compounds including Cu, Cr, V, Fe, Ni or Co that cause coloring are not used.

When the individual components are adjusted into the above-mentioned ratios, a high refractive index-lower to middle dispersion type optical glass composition is obtained that has a refractive index (nd) to the d-line of 1.83 or higher and 1.86 or lower and an Abbe number (vd) to the d-line of 43 or higher and 46 or lower, and yet has a liquidus temperature of 1200° C. or lower.

Here, when the glass is handled in a softened or molten state, from the viewpoints of melting property, processability (droplet property), crystallinity and the like, a lower liquidus temperature is generally preferable in the optical glass. Accordingly, as mentioned above, the optical glass composition according to the present Embodiment V-1 has a liquidus temperature of 1200° C. or lower and, preferably, 1190° C. or lower.

(Embodiment V-2)

Next, a preform according to Embodiment V-2 of the present invention and a producing method for the same are described below in detail. The preform is softened by heating so as to be used at least for press molding. Thus, the weight and the shape of the preform are determined appropriately in accordance with the size and the shape of a press molded article serving as a final target. The preform according to the present Embodiment V-2 is formed from the optical glass composition according to the above-mentioned Embodiment V-1, and hence obtained without losing various features of the optical glass composition in Embodiment V-1.

The preform produced from the optical glass composition according to Embodiment V-1 is described below. Here, the preform is a preliminary glass form that is heated and used for precision press molding. The preforms are divided into a gob preform produced by forming a molten glass material and a polished preform produced by physically polishing a glass material. The optical glass composition according to Embodiment V-1 can be used for both of the gob preform and the polished preform.

The producing method for the preform is described below. First, glass raw materials (the above-mentioned individual components) for the optical glass composition according to the above-mentioned Embodiment V-1 are weighed and prepared, and then processed in processing steps such as dissolution, defoaming, fining and homogenization so that homogeneous molten glass is obtained which contains no foreign substances therein. Then, at the time when the molten glass is caused to flow out through an outflow pipe (referred to as a nozzle, hereinafter) made of platinum alloy or the like, a temperature condition for the vicinity of the nozzle is set up strictly into a range of not causing devitrification in the glass. The molten glass flowing out is cast into a receiving die having a receiving surface of planar shape, concave shape, convex shape or the like or into a molding die in which an enclosure is provided in the circumference of a planar surface, a concave surface or a convex surface. As a result, the molten glass is formed into a desired shape. In the following description, preferable forming methods are illustrated.

A first forming method is one example of producing methods for the gob preform. First, a molten glass lump having a weight corresponding to a final molded article or alternatively a desired weight including an addition necessary for secondary processing into a final molded article is dropped into each of a plurality of receiving dies arranged under the nozzle. Then, cooling is performed simultaneously to the forming of glass lumps so that gob preforms are obtained.

A second forming method is another example of producing methods for the gob preform. The second forming method is suitable for a case that a preform having a relatively heavy weight is to be produced. First, the tip of the molten glass flowing out through the nozzle is brought into contact with the receiving die surface. Then, at each time when a desired weight is reached, the receiving die is rapidly separated from the molten glass so that the molten glass is cut off. As a result, the forming of glass free from striae and shear marks is achieved. Further, when necessary, press molding may be performed with aiming simultaneously at cooling of the molten glass lump, so that a desired shape may be imparted and gob preforms are obtained.

A third forming method is one example of producing methods for the polished preform. First, a glass lump having a desired shape is produced by a similar method to the first and the second forming methods. At this time, the glass lump having a desired shape has a total weight of a desired weight plus an additional weight necessary for finishing all the surfaces including optically functional surfaces of a final product (such as a lens) by means of machining. Then, the glass lump having a desired shape is cut and polished by means of machining so that polished preforms are obtained.

The preform obtained by each of the first and the second forming methods described above can be used as a preform for press molding directly in precision press molding. Further, the third forming method provides a preform for polish. In order that breakage should be avoided in the preform at the time of handling, for example, a three-dimensional cooling method, an optimal cooling rate, an annealing treatment and the like may be selected depending on the shape and the weight.

As described above, a preform for press molding and a preform for polish having a desired weight can be obtained from the optical glass composition according to Embodiment V-1. In the case of a preform for press molding, for the purpose of mold release at the time of forming, it is preferable that the surface roughness of the receiving die surface is adjusted or alternatively that a mold-release film is formed. In the case of a preform for polish, when an HBN (boron-containing mold-releasing agent) is applied, releasing from the die becomes easier. Thus, this approach is preferable.

(Embodiment V-3)

Next, an optical element according to Embodiment V-3 of the present invention is described below. The optical element according to Embodiment V-3 has optical indices determined by the composition of the optical glass composition according to the above-mentioned Embodiment V-1. That is, the refractive index (nd) to the d-line is 1.83 to 1.86, while the Abbe number (vd) to the d-line is 43 to 46, and while the liquidus temperature is 1200° C. or lower. Further, this optical element has also a feature that optical absorption by coloring is low in a visible light range. The optical element employing the optical glass composition according to Embodiment V-1 is an optical element suitable for an optical system in a digital camera, a video camera, a mobile device or the like.

Examples of the optical element according to the present Embodiment V-3 include a spherical lens, an aspheric lens and a micro lens, as well as a prism and a diffraction grating. Other examples include an optical element cemented with an optical element composed of a glass material or an optical material of another kind.

Next, a producing method for the optical element according to Embodiment V-3 is described below. The optical element according to Embodiment V-3 can be produced by supplying the preform according to the above-mentioned Embodiment V-2 into a molding die, then softening it by heating, then performing press molding, and then performing polish when necessary.

Press molding methods employable for obtaining the optical element are divided into two typical methods. These methods are selected depending on the means of forming optically functional surfaces where light enters and exits.

First means is means referred to as precision press molding. The molding surfaces of a press molding die are precisely processed in advance into reversal shapes of the optically functional surfaces of the optical element serving as a final molded article. Then, when necessary, a mold-release film is provided in order to avoid fusion between the preform and the molding die. Then, press molding is performed so that the shape of the above-mentioned molding surface is precisely transferred to the preform for press molding having been softened by heating. According to this means, grinding and polishing of optically functional surfaces are unnecessary. That is, the optical element can be produced solely by press molding. The press molding is performed in an inert atmosphere like in nitrogen gas. Here, when a preform for press molding having an additional weight relative to the final molded article is used, for example, in the case of a lens, centering may be performed by grinding by the amount corresponding to the additional weight.

Second means is that press molding is performed using a preform for polish having a shape which is similar to the shape of the optical element serving as a final molded article and which is larger than the optical element. The formed press molded article contains optically functional surfaces, and the surfaces of the optical element are formed by machining. In the press molded article, in order that breakage that could be caused by the machining should be avoided in the glass, residual strain need be minimized. Further, also in order that required optical indices should be achieved, an appropriate annealing treatment is necessary. According to this means, press molding may be performed in an ordinary atmosphere. Further, the above-mentioned mold-releasing agent may be used.

Here, in both cases regardless of whether the first means or the second means described above is selected, the refractive index (nd) and the Abbe number (vd) of the obtained optical element varies slightly owing to the heat history in the producing process. Thus, when an optical element having precisely specified optical indices is to be produced, component adjustment for the optical glass composition, heat history adjustment in the producing process, adjustment of incorporating the amount of variation into the optical design when necessary, or the like may be selected appropriately with taking into consideration the above-mentioned variation in the refractive index (nd) and the Abbe number (vd). As a result, an optical element is obtained that has desired optical indices and an excellent transmissivity and that is particularly suitable as an optical component of a device which incorporates a solid-state image sensor or the like.

EXAMPLES

Next, the embodiments of the present invention are described below in further detail with reference to the following examples. However, the embodiments are not limited to these examples.

Operation in the examples and comparative examples was as follows. First, raw material mixture composed of predetermined amounts of oxides and carbonates was put into a platinum crucible. Then, the raw material mixture was melted at 1350° C. to 1450° C. for 1 hour with stirring it intermittently. After that, the melt was caused to flow into a molding die having been heated in advance, then held for 1 hour in an electric furnace set at a temperature higher than the expected Tg, and then cooled in the furnace at a cooling rate of 30° C./hour, so that an optical glass lump was obtained. After that, using polished samples cut out from the optical glass lump, the refractive index (nd), the dispersion (vd: Abbe number) and the liquidus temperature were measured in all of the examples and comparative examples. The compositions (component ratios) of the glass in the examples and the comparative examples are shown in the following tables.

In the tables, the following points are to be noted.

(1) The component ratios in the composition fields in each table are expressed in % by mole calculated from batch materials.

(2) The "nd" and the "vd" indicate respectively the refractive index and the Abbe number at room temperature.

(3) The liquidus temperature is obtained by a method in that the polished samples are maintained for 1 hour in a devitrification tester with a temperature gradient of 1000-1400° C. and then formation of a crystal on the polished samples is examined under a microscope of 40 times power.

TABLE I-1

| Component | Example | | | | | | | | |
|---|---|---|---|---|---|---|---|---|---|
| (% by mole) | I-1 | I-2 | I-3 | I-4 | I-5 | I-6 | I-7 | I-8 | I-9 |
| $SiO_2$ | 15.9 | 15.9 | 15.8 | 15.8 | 13.3 | 19.3 | 22.0 | 16.7 | 16.7 |
| $B_2O_3$ | 31.3 | 31.2 | 31.2 | 31.2 | 33.7 | 30.2 | 27.7 | 33.0 | 33.0 |
| $K_2O$ | 0.0 | 0.0 | 0.0 | 0.0 | 0.0 | 0.0 | 0.0 | 0.0 | 0.0 |

TABLE I-1-continued

| Component | Example | | | | | | | | |
|---|---|---|---|---|---|---|---|---|---|
| (% by mole) | I-1 | I-2 | I-3 | I-4 | I-5 | I-6 | I-7 | I-8 | I-9 |
| $Na_2O$ | 0.0 | 0.0 | 0.0 | 0.0 | 0.0 | 0.0 | 0.0 | 0.0 | 0.0 |
| $Li_2O$ | 2.7 | 2.7 | 2.7 | 2.7 | 2.7 | 2.8 | 2.8 | 0.0 | 0.0 |
| ZnO | 11.7 | 11.7 | 11.7 | 11.7 | 11.8 | 6.1 | 6.1 | 13.4 | 13.4 |
| MgO | 0.0 | 0.0 | 0.0 | 0.0 | 0.0 | 0.0 | 0.0 | 0.0 | 0.0 |
| SrO | 0.0 | 0.0 | 0.0 | 0.0 | 0.0 | 0.0 | 0.0 | 0.0 | 0.0 |
| BaO | 0.0 | 0.0 | 0.0 | 0.0 | 0.0 | 0.0 | 0.0 | 0.0 | 0.0 |
| $Al_2O_3$ | 0.0 | 0.0 | 0.0 | 0.0 | 0.0 | 0.0 | 0.0 | 0.0 | 0.0 |
| $ZrO_2$ | 7.7 | 7.7 | 7.7 | 7.7 | 7.8 | 8.1 | 8.0 | 2.7 | 2.7 |
| $La_2O_3$ | 15.3 | 16.2 | 17.2 | 18.1 | 15.3 | 17.4 | 17.4 | 16.9 | 17.9 |
| $Nb_2O_5$ | 0.0 | 0.0 | 0.0 | 0.0 | 0.0 | 0.0 | 0.0 | 0.0 | 0.0 |
| $TiO_2$ | 0.0 | 0.0 | 0.0 | 0.0 | 0.0 | 0.0 | 0.0 | 0.0 | 0.0 |
| $Ta_2O_5$ | 2.3 | 2.3 | 2.3 | 2.3 | 2.3 | 2.4 | 2.4 | 3.4 | 3.4 |
| $Gd_2O_3$ | 13.2 | 12.3 | 11.4 | 10.5 | 13.2 | 13.7 | 13.7 | 13.9 | 12.9 |
| $Y_2O_3$ | 0.0 | 0.0 | 0.0 | 0.0 | 0.0 | 0.0 | 0.0 | 0.0 | 0.0 |
| $Yb_2O_3$ | 0.0 | 0.0 | 0.0 | 0.0 | 0.0 | 0.0 | 0.0 | 0.0 | 0.0 |
| $WO_3$ | 0.0 | 0.0 | 0.0 | 0.0 | 0.0 | 0.0 | 0.0 | 0.0 | 0.0 |
| $La_2O_3 + Gd_2O_3 + B_2O_3$ | 59.8 | 59.7 | 59.8 | 59.8 | 62.2 | 61.3 | 58.8 | 63.8 | 63.8 |
| $La_2O_3 + Gd_2O_3$ | 28.5 | 28.5 | 28.6 | 28.6 | 28.5 | 31.1 | 31.1 | 30.8 | 30.8 |
| nd | 1.84582 | 1.84620 | 1.84559 | 1.84762 | 1.84555 | 1.85066 | 1.85024 | 1.84391 | 1.84279 |
| vd | 44.5 | 44.5 | 44.5 | 44.6 | 44.6 | 44.9 | 44.3 | 44.6 | 44.1 |
| Liquidus temperature (° C.) | 1275 | 1275 | 1275 | 1275 | 1270 | 1275 | 1275 | 1225 | 1275 |

TABLE I-2

| Component | Example | | | | | | | | |
|---|---|---|---|---|---|---|---|---|---|
| (% by mole) | I-10 | I-11 | I-12 | I-13 | I-14 | I-15 | I-16 | I-17 | I-18 |
| $SiO_2$ | 16.7 | 16.7 | 14.0 | 19.5 | 22.2 | 18.2 | 16.9 | 14.2 | 19.5 |
| $B_2O_3$ | 32.9 | 32.9 | 35.5 | 30.5 | 28.0 | 30.6 | 30.8 | 31.2 | 29.4 |
| $K_2O$ | 0.0 | 0.0 | 0.0 | 0.0 | 0.0 | 0.0 | 0.0 | 0.0 | 0.0 |
| $Na_2O$ | 0.0 | 0.0 | 0.0 | 0.0 | 0.0 | 0.0 | 0.0 | 0.0 | 0.0 |
| $Li_2O$ | 0.0 | 0.0 | 0.0 | 0.0 | 0.0 | 0.0 | 0.0 | 0.0 | 0.0 |
| ZnO | 13.4 | 13.3 | 13.4 | 13.3 | 13.3 | 13.4 | 13.5 | 13.6 | 13.4 |
| MgO | 0.0 | 0.0 | 0.0 | 0.0 | 0.0 | 0.0 | 0.0 | 0.0 | 0.0 |
| SrO | 0.0 | 0.0 | 0.0 | 0.0 | 0.0 | 0.0 | 0.0 | 0.0 | 0.0 |
| BaO | 0.0 | 0.0 | 0.0 | 0.0 | 0.0 | 0.0 | 0.0 | 0.0 | 0.0 |
| $Al_2O_3$ | 0.0 | 0.0 | 0.0 | 0.0 | 0.0 | 0.8 | 1.7 | 3.4 | 0.8 |
| $ZrO_2$ | 2.7 | 2.7 | 2.7 | 2.7 | 2.7 | 2.7 | 2.7 | 2.8 | 2.7 |
| $La_2O_3$ | 18.9 | 19.9 | 16.9 | 16.8 | 16.7 | 16.9 | 17.0 | 17.2 | 16.9 |
| $Nb_2O_5$ | 0.0 | 0.0 | 0.0 | 0.0 | 0.0 | 0.0 | 0.0 | 0.0 | 0.0 |
| $TiO_2$ | 0.0 | 0.0 | 0.0 | 0.0 | 0.0 | 0.0 | 0.0 | 0.0 | 0.0 |
| $Ta_2O_5$ | 3.4 | 3.4 | 3.4 | 3.4 | 3.4 | 3.4 | 3.4 | 3.5 | 3.4 |
| $Gd_2O_3$ | 12.0 | 11.1 | 13.9 | 13.8 | 13.8 | 13.9 | 14.0 | 14.1 | 13.9 |
| $Y_2O_3$ | 0.0 | 0.0 | 0.0 | 0.0 | 0.0 | 0.0 | 0.0 | 0.0 | 0.0 |
| $Yb_2O_3$ | 0.0 | 0.0 | 0.0 | 0.0 | 0.0 | 0.0 | 0.0 | 0.0 | 0.0 |
| $WO_3$ | 0.0 | 0.0 | 0.0 | 0.0 | 0.0 | 0.0 | 0.0 | 0.0 | 0.0 |
| $La_2O_3 + Gd_2O_3 + B_2O_3$ | 63.8 | 63.9 | 66.3 | 61.1 | 58.5 | 61.4 | 61.8 | 62.5 | 60.2 |
| $La_2O_3 + Gd_2O_3$ | 30.9 | 31.0 | 30.8 | 30.6 | 30.5 | 30.8 | 31.0 | 31.3 | 30.8 |
| nd | 1.84478 | 1.84561 | 1.84248 | 1.84505 | 1.84526 | 1.84549 | 1.84844 | 1.84854 | 1.84503 |
| vd | 44.3 | 44.6 | 44.8 | 44.7 | 44.4 | 44.9 | 44.6 | 44.3 | 44.3 |
| Liquidus temperature (° C.) | 1275 | 1275 | 1270 | 1225 | 1270 | 1235 | 1235 | 1275 | 1235 |

TABLE I-3

| Component | Example | | | | | | | | |
|---|---|---|---|---|---|---|---|---|---|
| (% by mole) | I-19 | I-20 | I-21 | I-22 | I-23 | I-24 | I-25 | I-26 | I-27 |
| $SiO_2$ | 19.6 | 19.8 | 18.2 | 16.8 | 18.1 | 16.7 | 18.2 | 16.9 | 17.9 |
| $B_2O_3$ | 28.3 | 26.1 | 30.6 | 30.8 | 30.5 | 30.5 | 30.6 | 30.8 | 30.3 |
| $K_2O$ | 0.0 | 0.0 | 0.9 | 1.8 | 0.0 | 0.0 | 0.0 | 0.0 | 0.0 |
| $Na_2O$ | 0.0 | 0.0 | 0.0 | 0.0 | 1.3 | 2.7 | 0.0 | 0.0 | 0.0 |
| $Li_2O$ | 0.0 | 0.0 | 0.0 | 0.0 | 0.0 | 0.0 | 0.0 | 0.0 | 0.0 |
| ZnO | 13.4 | 13.5 | 13.4 | 13.5 | 13.3 | 13.3 | 13.4 | 13.5 | 13.2 |
| MgO | 0.0 | 0.0 | 0.0 | 0.0 | 0.0 | 0.0 | 0.0 | 0.0 | 2.1 |
| SrO | 0.0 | 0.0 | 0.0 | 0.0 | 0.0 | 0.0 | 0.8 | 1.6 | 0.0 |

TABLE I-3-continued

| Component (% by mole) | I-19 | I-20 | I-21 | I-22 | I-23 | I-24 | I-25 | I-26 | I-27 |
|---|---|---|---|---|---|---|---|---|---|
| BaO | 0.0 | 0.0 | 0.0 | 0.0 | 0.0 | 0.0 | 0.0 | 0.0 | 0.0 |
| $Al_2O_3$ | 1.7 | 3.3 | 0.0 | 0.0 | 0.0 | 0.0 | 0.0 | 0.0 | 0.0 |
| $ZrO_2$ | 2.7 | 2.8 | 2.7 | 2.7 | 2.7 | 2.7 | 2.7 | 2.7 | 2.7 |
| $La_2O_3$ | 16.9 | 17.1 | 16.9 | 17.0 | 16.8 | 16.8 | 16.9 | 17.0 | 16.7 |
| $Nb_2O_5$ | 0.0 | 0.0 | 0.0 | 0.0 | 0.0 | 0.0 | 0.0 | 0.0 | 0.0 |
| $TiO_2$ | 0.0 | 0.0 | 0.0 | 0.0 | 0.0 | 0.0 | 0.0 | 0.0 | 0.0 |
| $Ta_2O_5$ | 3.4 | 3.5 | 3.4 | 3.4 | 3.4 | 3.4 | 3.4 | 3.4 | 3.4 |
| $Gd_2O_3$ | 13.9 | 14.0 | 13.9 | 14.0 | 13.8 | 13.8 | 13.9 | 14.0 | 13.7 |
| $Y_2O_3$ | 0.0 | 0.0 | 0.0 | 0.0 | 0.0 | 0.0 | 0.0 | 0.0 | 0.0 |
| $Yb_2O_3$ | 0.0 | 0.0 | 0.0 | 0.0 | 0.0 | 0.0 | 0.0 | 0.0 | 0.0 |
| $WO_3$ | 0.0 | 0.0 | 0.0 | 0.0 | 0.0 | 0.0 | 0.0 | 0.0 | 0.0 |
| $La_2O_3 + Gd_2O_3 + B_2O_3$ | 59.1 | 57.2 | 61.4 | 61.8 | 61.1 | 61.1 | 61.4 | 61.8 | 60.7 |
| $La_2O_3 + Gd_2O_3$ | 30.8 | 31.1 | 30.8 | 31.0 | 30.6 | 30.6 | 30.8 | 31.0 | 30.4 |
| nd | 1.84682 | 1.84987 | 1.84495 | 1.84926 | 1.84321 | 1.84160 | 1.84698 | 1.84808 | 1.84661 |
| νd | 44.3 | 44.1 | 44.6 | 44.5 | 44.5 | 44.2 | 44.7 | 44.5 | 44.2 |
| Liquidus temperature (° C.) | 1235 | 1280 | 1235 | 1280 | 1280 | 1280 | 1280 | 1295 | 1275 |

TABLE I-4

| Component (% by mole) | I-28 | I-29 | I-30 | I-31 | I-32 | I-33 | I-34 | I-35 | I-36 |
|---|---|---|---|---|---|---|---|---|---|
| $SiO_2$ | 18.2 | 19.4 | 19.5 | 19.4 | 19.4 | 19.6 | 19.2 | 19.6 | 19.6 |
| $B_2O_3$ | 30.7 | 30.4 | 30.5 | 30.4 | 30.3 | 30.6 | 30.1 | 30.6 | 30.6 |
| $K_2O$ | 0.0 | 0.0 | 0.0 | 0.0 | 0.0 | 0.0 | 0.0 | 0.0 | 0.0 |
| $Na_2O$ | 0.0 | 0.0 | 0.0 | 0.0 | 0.0 | 0.0 | 0.0 | 0.0 | 0.0 |
| $Li_2O$ | 0.0 | 0.0 | 0.0 | 0.0 | 0.0 | 0.0 | 0.0 | 0.0 | 0.0 |
| ZnO | 13.5 | 13.3 | 13.4 | 13.3 | 13.4 | 13.4 | 13.2 | 13.4 | 13.4 |
| MgO | 0.0 | 0.0 | 0.0 | 0.0 | 0.0 | 0.0 | 0.0 | 0.0 | 0.0 |
| SrO | 0.0 | 0.0 | 0.0 | 0.0 | 0.0 | 0.0 | 0.0 | 0.0 | 0.0 |
| BaO | 0.5 | 0.0 | 0.0 | 0.0 | 0.0 | 0.0 | 0.0 | 0.0 | 0.0 |
| $Al_2O_3$ | 0.0 | 0.0 | 0.0 | 0.0 | 0.0 | 0.0 | 0.0 | 0.0 | 0.0 |
| $ZrO_2$ | 2.7 | 2.7 | 2.7 | 2.7 | 2.7 | 2.7 | 2.7 | 2.7 | 2.7 |
| $La_2O_3$ | 17.0 | 16.3 | 16.3 | 16.3 | 21.8 | 11.7 | 16.2 | 12.8 | 12.8 |
| $Nb_2O_5$ | 0.0 | 0.6 | 0.0 | 0.0 | 0.0 | 0.0 | 0.0 | 0.0 | 0.0 |
| $TiO_2$ | 0.0 | 0.0 | 0.0 | 0.0 | 0.0 | 0.0 | 1.7 | 0.0 | 0.0 |
| $Ta_2O_5$ | 3.4 | 3.4 | 3.8 | 3.4 | 3.4 | 3.4 | 3.4 | 3.4 | 3.4 |
| $Gd_2O_3$ | 13.9 | 13.8 | 13.8 | 13.8 | 9.2 | 18.5 | 13.6 | 16.2 | 16.2 |
| $Y_2O_3$ | 0.0 | 0.0 | 0.0 | 0.0 | 0.0 | 0.0 | 0.0 | 1.3 | 0.0 |
| $Yb_2O_3$ | 0.0 | 0.0 | 0.0 | 0.0 | 0.0 | 0.0 | 0.0 | 0.0 | 1.3 |
| $WO_3$ | 0.0 | 0.0 | 0.0 | 0.7 | 0.0 | 0.0 | 0.0 | 0.0 | 0.0 |
| $La_2O_3 + Gd_2O_3 + B_2O_3$ | 61.6 | 60.5 | 60.6 | 60.5 | 61.3 | 60.8 | 59.9 | 59.6 | 59.6 |
| $La_2O_3 + Gd_2O_3$ | 30.9 | 30.1 | 30.1 | 30.1 | 31.0 | 30.2 | 29.8 | 29.0 | 29.0 |
| nd | 1.84709 | 1.84775 | 1.84512 | 1.84570 | 1.84592 | 1.84123 | 1.85046 | 1.84232 | 1.84045 |
| νd | 44.1 | 43.8 | 44.4 | 44.1 | 43.0 | 44.8 | 43.2 | 44.7 | 44.8 |
| Liquidus temperature (° C.) | 1290 | 1250 | 1250 | 1250 | 1290 | 1260 | 1260 | 1260 | 1250 |

TABLE I-5

| Component (% by mole) | I-1 | I-2 | I-3 | I-4 | I-5 |
|---|---|---|---|---|---|
| | \multicolumn{5}{c}{Comparative Example} |
| $SiO_2$ | 11.1 | 13.9 | 8.8 | 7.9 | 8.5 |
| $B_2O_3$ | 37.8 | 35.2 | 41.3 | 37.2 | 40.0 |
| $K_2O$ | 0.0 | 0.0 | 0.0 | 0.0 | 0.0 |
| $Na_2O$ | 0.0 | 0.0 | 0.0 | 0.0 | 0.0 |
| $Li_2O$ | 2.8 | 2.8 | 2.8 | 2.5 | 2.7 |
| ZnO | 6.2 | 6.1 | 10.1 | 21.8 | 9.8 |
| MgO | 0.0 | 0.0 | 0.0 | 0.0 | 0.0 |
| SrO | 0.0 | 0.0 | 0.0 | 0.0 | 0.0 |
| BaO | 0.0 | 0.0 | 0.0 | 0.0 | 0.0 |
| $Al_2O_3$ | 0.0 | 0.0 | 0.0 | 0.0 | 0.0 |
| $ZrO_2$ | 8.1 | 8.1 | 6.0 | 5.4 | 10.3 |
| $La_2O_3$ | 17.6 | 17.6 | 12.3 | 9.5 | 11.9 |
| $Nb_2O_5$ | 0.0 | 0.0 | 0.0 | 0.0 | 0.0 |

TABLE I-5-continued

| Component | Comparative Example | | | | |
|---|---|---|---|---|---|
| (% by mole) | I-1 | I-2 | I-3 | I-4 | I-5 |
| $TiO_2$ | 0.0 | 0.0 | 0.0 | 0.0 | 0.0 |
| $Ta_2O_5$ | 2.5 | 2.5 | 7.4 | 5.5 | 5.9 |
| $Gd_2O_3$ | 13.9 | 13.8 | 11.3 | 10.2 | 11.0 |
| $Y_2O_3$ | 0.0 | 0.0 | 0.0 | 0.0 | 0.0 |
| $Yb_2O_3$ | 0.0 | 0.0 | 0.0 | 0.0 | 0.0 |
| $WO_3$ | 0.0 | 0.0 | 0.0 | 0.0 | 0.0 |
| $La_2O_3 + Gd_2O_3 + B_2O_3$ | 69.3 | 66.6 | 64.9 | 56.9 | 62.9 |
| $La_2O_3 + Gd_2O_3$ | 31.5 | 31.4 | 23.6 | 19.7 | 22.9 |
| nd | 1.84884 | 1.85019 | 1.84596 | 1.85547 | 1.84999 |
| νd | 44.9 | 44.8 | 42.6 | 42.5 | 42.3 |
| Liquidus temperature (° C.) | 1364 | 1364 | — | — | — |

Note:
In Comparative Examples I-3 to I-5, each liquidus temperature was not obtained because νd is less than 43.

As seen from Tables I-1 to I-4 given above, the optical glass composition according to each of Examples I-1 to I-36 has a refractive index (nd) to the d-line falling within a high refractive index range of 1.83 or higher and 1.86 or lower and an Abbe number (νd) to the d-line falling within a lower to middle dispersion range of 43 or higher and 46 or lower, and yet has a low liquidus temperature of 1300° C. or lower.

TABLE II-1

| Component | Example | | | | | | | |
|---|---|---|---|---|---|---|---|---|
| (% by mole) | II-1 | II-2 | II-3 | II-4 | II-5 | II-6 | II-7 | II-8 |
| $SiO_2$ | 16.7 | 16.7 | 16.7 | 16.7 | 11.2 | 14.0 | 19.5 | 22.2 |
| $B_2O_3$ | 33.0 | 33.0 | 32.9 | 32.9 | 38.1 | 35.5 | 30.5 | 28.0 |
| $K_2O$ | 0.0 | 0.0 | 0.0 | 0.0 | 0.0 | 0.0 | 0.0 | 0.0 |
| $Na_2O$ | 0.0 | 0.0 | 0.0 | 0.0 | 0.0 | 0.0 | 0.0 | 0.0 |
| $Li_2O$ | 0.0 | 0.0 | 0.0 | 0.0 | 0.0 | 0.0 | 0.0 | 0.0 |
| ZnO | 13.4 | 13.4 | 13.4 | 13.3 | 13.5 | 13.4 | 13.3 | 13.3 |
| MgO | 0.0 | 0.0 | 0.0 | 0.0 | 0.0 | 0.0 | 0.0 | 0.0 |
| SrO | 0.0 | 0.0 | 0.0 | 0.0 | 0.0 | 0.0 | 0.0 | 0.0 |
| BaO | 0.0 | 0.0 | 0.0 | 0.0 | 0.0 | 0.0 | 0.0 | 0.0 |
| $Al_2O_3$ | 0.0 | 0.0 | 0.0 | 0.0 | 0.0 | 0.0 | 0.0 | 0.0 |
| $ZrO_2$ | 2.7 | 2.7 | 2.7 | 2.7 | 2.7 | 2.7 | 2.7 | 2.7 |
| $La_2O_3$ | 16.9 | 17.9 | 18.9 | 19.9 | 17.0 | 16.9 | 16.8 | 16.7 |
| $Nb_2O_5$ | 0.0 | 0.0 | 0.0 | 0.0 | 0.0 | 0.0 | 0.0 | 0.0 |
| $TiO_2$ | 0.0 | 0.0 | 0.0 | 0.0 | 0.0 | 0.0 | 0.0 | 0.0 |
| $Ta_2O_5$ | 3.4 | 3.4 | 3.4 | 3.4 | 3.4 | 3.4 | 3.4 | 3.4 |
| $Gd_2O_3$ | 13.9 | 12.9 | 12.0 | 11.1 | 14.0 | 13.9 | 13.8 | 13.8 |
| $Y_2O_3$ | 0.0 | 0.0 | 0.0 | 0.0 | 0.0 | 0.0 | 0.0 | 0.0 |
| $Yb_2O_3$ | 0.0 | 0.0 | 0.0 | 0.0 | 0.0 | 0.0 | 0.0 | 0.0 |
| $WO_3$ | 0.0 | 0.0 | 0.0 | 0.0 | 0.0 | 0.0 | 0.0 | 0.0 |
| $La_2O_3/Gd_2O_3$ (molar ratio) | 1.22 | 1.39 | 1.58 | 1.79 | 1.21 | 1.22 | 1.22 | 1.21 |
| nd | 1.84391 | 1.84279 | 1.84478 | 1.84561 | 1.84092 | 1.84248 | 1.84505 | 1.84526 |
| νd | 44.6 | 44.1 | 44.3 | 44.6 | 45.2 | 44.8 | 44.7 | 44.4 |
| Liquidus temperature (° C.) | 1225 | 1275 | 1275 | 1275 | 1270 | 1270 | 1225 | 1270 |

TABLE II-2

| Component | Example | | | | | | | |
|---|---|---|---|---|---|---|---|---|
| (% by mole) | II-9 | II-10 | II-11 | II-12 | II-13 | II-14 | II-15 | II-16 |
| $SiO_2$ | 18.2 | 16.9 | 14.2 | 8.7 | 19.5 | 19.6 | 19.8 | 18.2 |
| $B_2O_3$ | 30.6 | 30.8 | 31.2 | 31.9 | 29.4 | 28.3 | 26.1 | 30.6 |
| $K_2O$ | 0.0 | 0.0 | 0.0 | 0.0 | 0.0 | 0.0 | 0.0 | 0.9 |
| $Na_2O$ | 0.0 | 0.0 | 0.0 | 0.0 | 0.0 | 0.0 | 0.0 | 0.0 |
| $Li_2O$ | 0.0 | 0.0 | 0.0 | 0.0 | 0.0 | 0.0 | 0.0 | 0.0 |
| ZnO | 13.4 | 13.5 | 13.6 | 14.0 | 13.4 | 13.4 | 13.5 | 13.4 |
| MgO | 0.0 | 0.0 | 0.0 | 0.0 | 0.0 | 0.0 | 0.0 | 0.0 |
| SrO | 0.0 | 0.0 | 0.0 | 0.0 | 0.0 | 0.0 | 0.0 | 0.0 |

TABLE II-2-continued

| Component (% by mole) | Example | | | | | | | |
|---|---|---|---|---|---|---|---|---|
| | II-9 | II-10 | II-11 | II-12 | II-13 | II-14 | II-15 | II-16 |
| BaO | 0.0 | 0.0 | 0.0 | 0.0 | 0.0 | 0.0 | 0.0 | 0.0 |
| $Al_2O_3$ | 0.8 | 1.7 | 3.4 | 6.9 | 0.8 | 1.7 | 3.3 | 0.0 |
| $ZrO_2$ | 2.7 | 2.7 | 2.8 | 2.8 | 2.7 | 2.7 | 2.8 | 2.7 |
| $La_2O_3$ | 16.9 | 17.0 | 17.2 | 17.6 | 16.9 | 16.9 | 17.1 | 16.9 |
| $Nb_2O_5$ | 0.0 | 0.0 | 0.0 | 0.0 | 0.0 | 0.0 | 0.0 | 0.0 |
| $TiO_2$ | 0.0 | 0.0 | 0.0 | 0.0 | 0.0 | 0.0 | 0.0 | 0.0 |
| $Ta_2O_5$ | 3.4 | 3.4 | 3.5 | 3.6 | 3.4 | 3.4 | 3.5 | 3.4 |
| $Gd_2O_3$ | 13.9 | 14.0 | 14.1 | 14.5 | 13.9 | 13.9 | 14.0 | 13.9 |
| $Y_2O_3$ | 0.0 | 0.0 | 0.0 | 0.0 | 0.0 | 0.0 | 0.0 | 0.0 |
| $Yb_2O_3$ | 0.0 | 0.0 | 0.0 | 0.0 | 0.0 | 0.0 | 0.0 | 0.0 |
| $WO_3$ | 0.0 | 0.0 | 0.0 | 0.0 | 0.0 | 0.0 | 0.0 | 0.0 |
| $La_2O_3/Gd_2O_3$ (molar ratio) | 1.22 | 1.21 | 1.22 | 1.21 | 1.22 | 1.22 | 1.22 | 1.22 |
| nd | 1.84549 | 1.84844 | 1.84854 | 1.85210 | 1.84503 | 1.84682 | 1.84987 | 1.84495 |
| νd | 44.9 | 44.6 | 44.3 | 43.8 | 44.3 | 44.3 | 44.1 | 44.6 |
| Liquidus temperature (° C.) | 1235 | 1235 | 1275 | 1275 | 1235 | 1235 | 1280 | 1235 |

TABLE II-3

| Component (% by mole) | Example | | | | | | | |
|---|---|---|---|---|---|---|---|---|
| | II-17 | II-18 | II-19 | II-20 | II-21 | II-22 | II-23 | II-24 |
| $SiO_2$ | 16.8 | 18.1 | 16.7 | 18.2 | 16.9 | 17.9 | 18.2 | 19.4 |
| $B_2O_3$ | 30.8 | 30.5 | 30.5 | 30.6 | 30.8 | 30.3 | 30.7 | 30.4 |
| $K_2O$ | 1.8 | 0.0 | 0.0 | 0.0 | 0.0 | 0.0 | 0.0 | 0.0 |
| $Na_2O$ | 0.0 | 1.3 | 2.7 | 0.0 | 0.0 | 0.0 | 0.0 | 0.0 |
| $Li_2O$ | 0.0 | 0.0 | 0.0 | 0.0 | 0.0 | 0.0 | 0.0 | 0.0 |
| ZnO | 13.5 | 13.3 | 13.3 | 13.4 | 13.5 | 13.2 | 13.5 | 13.3 |
| MgO | 0.0 | 0.0 | 0.0 | 0.0 | 0.0 | 2.1 | 0.0 | 0.0 |
| SrO | 0.0 | 0.0 | 0.0 | 0.8 | 1.6 | 0.0 | 0.0 | 0.0 |
| BaO | 0.0 | 0.0 | 0.0 | 0.0 | 0.0 | 0.0 | 0.5 | 0.0 |
| $Al_2O_3$ | 0.0 | 0.0 | 0.0 | 0.0 | 0.0 | 0.0 | 0.0 | 0.0 |
| $ZrO_2$ | 2.7 | 2.7 | 2.7 | 2.7 | 2.7 | 2.7 | 2.7 | 2.7 |
| $La_2O_3$ | 17.0 | 16.8 | 16.8 | 16.9 | 17.0 | 16.7 | 17.0 | 16.3 |
| $Nb_2O_5$ | 0.0 | 0.0 | 0.0 | 0.0 | 0.0 | 0.0 | 0.0 | 0.6 |
| $TiO_2$ | 0.0 | 0.0 | 0.0 | 0.0 | 0.0 | 0.0 | 0.0 | 0.0 |
| $Ta_2O_5$ | 3.4 | 3.4 | 3.4 | 3.4 | 3.4 | 3.4 | 3.4 | 3.4 |
| $Gd_2O_3$ | 14.0 | 13.8 | 13.8 | 13.9 | 14.0 | 13.7 | 13.9 | 13.8 |
| $Y_2O_3$ | 0.0 | 0.0 | 0.0 | 0.0 | 0.0 | 0.0 | 0.0 | 0.0 |
| $Yb_2O_3$ | 0.0 | 0.0 | 0.0 | 0.0 | 0.0 | 0.0 | 0.0 | 0.0 |
| $WO_3$ | 0.0 | 0.0 | 0.0 | 0.0 | 0.0 | 0.0 | 0.0 | 0.0 |
| $La_2O_3/Gd_2O_3$ (molar ratio) | 1.21 | 1.22 | 1.22 | 1.22 | 1.21 | 1.22 | 1.22 | 1.18 |
| nd | 1.84926 | 1.84321 | 1.84160 | 1.84698 | 1.84808 | 1.84661 | 1.84709 | 1.84775 |
| νd | 44.5 | 44.5 | 44.2 | 44.7 | 44.5 | 44.2 | 44.1 | 43.8 |
| Liquidus temperature (° C.) | 1280 | 1280 | 1280 | 1280 | 1295 | 1275 | 1290 | 1250 |

TABLE II-4

| Component (% by mole) | Example | | | | | | |
|---|---|---|---|---|---|---|---|
| | II-25 | II-26 | II-27 | II-28 | II-29 | II-30 | II-31 |
| $SiO_2$ | 19.5 | 19.4 | 19.4 | 19.6 | 19.2 | 19.6 | 19.6 |
| $B_2O_3$ | 30.5 | 30.4 | 30.3 | 30.6 | 30.1 | 30.6 | 30.6 |
| $K_2O$ | 0.0 | 0.0 | 0.0 | 0.0 | 0.0 | 0.0 | 0.0 |
| $Na_2O$ | 0.0 | 0.0 | 0.0 | 0.0 | 0.0 | 0.0 | 0.0 |
| $Li_2O$ | 0.0 | 0.0 | 0.0 | 0.0 | 0.0 | 0.0 | 0.0 |
| ZnO | 13.4 | 13.3 | 13.3 | 13.4 | 13.2 | 13.4 | 13.4 |
| MgO | 0.0 | 0.0 | 0.0 | 0.0 | 0.0 | 0.0 | 0.0 |
| SrO | 0.0 | 0.0 | 0.0 | 0.0 | 0.0 | 0.0 | 0.0 |
| BaO | 0.0 | 0.0 | 0.0 | 0.0 | 0.0 | 0.0 | 0.0 |
| $Al_2O_3$ | 0.0 | 0.0 | 0.0 | 0.0 | 0.0 | 0.0 | 0.0 |
| $ZrO_2$ | 2.7 | 2.7 | 2.7 | 2.7 | 2.7 | 2.7 | 2.7 |
| $La_2O_3$ | 16.3 | 16.3 | 21.8 | 11.7 | 16.2 | 12.8 | 12.8 |
| $Nb_2O_5$ | 0.0 | 0.0 | 0.0 | 0.0 | 0.0 | 0.0 | 0.0 |
| $TiO_2$ | 0.0 | 0.0 | 0.0 | 0.0 | 1.7 | 0.0 | 0.0 |
| $Ta_2O_5$ | 3.8 | 3.4 | 3.4 | 3.4 | 3.4 | 3.4 | 3.4 |

TABLE II-4-continued

| Component | Example | | | | | | |
|---|---|---|---|---|---|---|---|
| (% by mole) | II-25 | II-26 | II-27 | II-28 | II-29 | II-30 | II-31 |
| $Gd_2O_3$ | 13.8 | 13.8 | 9.2 | 18.5 | 13.6 | 16.2 | 16.2 |
| $Y_2O_3$ | 0.0 | 0.0 | 0.0 | 0.0 | 0.0 | 1.3 | 0.0 |
| $Yb_2O_3$ | 0.0 | 0.0 | 0.0 | 0.0 | 0.0 | 0.0 | 1.3 |
| $WO_3$ | 0.0 | 0.7 | 0.0 | 0.0 | 0.0 | 0.0 | 0.0 |
| $La_2O_3/Gd_2O_3$ (molar ratio) | 1.18 | 1.18 | 2.37 | 0.63 | 1.19 | 0.79 | 0.79 |
| nd | 1.84512 | 1.84570 | 1.84592 | 1.84123 | 1.85046 | 1.84232 | 1.84045 |
| vd | 44.4 | 44.1 | 43.0 | 44.8 | 43.2 | 44.7 | 44.8 |
| Liquidus temperature (° C.) | 1250 | 1250 | 1290 | 1260 | 1260 | 1260 | 1250 |

TABLE II-5

| Component | Comparative Example | |
|---|---|---|
| (% by mole) | II-1 | II-2 |
| $SiO_2$ | 10.7 | 19.3 |
| $B_2O_3$ | 36.1 | 30.2 |
| $K_2O$ | 0.0 | 0.0 |
| $Na_2O$ | 0.0 | 0.0 |
| $Li_2O$ | 2.7 | 0.0 |
| ZnO | 11.8 | 13.2 |
| MgO | 0.0 | 0.0 |
| SrO | 0.0 | 0.0 |
| BaO | 0.0 | 0.0 |
| $Al_2O_3$ | 0.0 | 0.0 |
| $ZrO_2$ | 7.8 | 2.7 |
| $La_2O_3$ | 15.4 | 24.3 |
| $Nb_2O_5$ | 0.0 | 0.0 |
| $TiO_2$ | 0.0 | 0.0 |
| $Ta_2O_5$ | 2.4 | 3.4 |
| $Gd_2O_3$ | 13.2 | 6.9 |
| $Y_2O_3$ | 0.0 | 0.0 |
| $Yb_2O_3$ | 0.0 | 0.0 |
| $WO_3$ | 0.0 | 0.0 |
| $La_2O_3/Gd_2O_3$ (molar ratio) | 1.17 | 3.52 |
| nd | 1.84474 | Devitrification |
| vd | 44.6 | |
| Liquidus temperature (° C.) | 1319 | |

As seen from Tables II-1 to II-4 given above, the optical glass composition according to each of Examples II-1 to II-31 has a refractive index (nd) to the d-line falling within a high refractive index range of 1.83 or higher and 1.87 or lower and an Abbe number (vd) to the d-line falling within a lower to middle dispersion range of 43 or higher and 47 or lower, and yet has a low liquidus temperature of 1300° C. or lower.

TABLE III-1

| Component | Example | | | | | | | |
|---|---|---|---|---|---|---|---|---|
| (% by mole) | III-1 | III-2 | III-3 | III-4 | III-5 | III-6 | III-7 | III-8 |
| $SiO_2$ | 16.7 | 16.7 | 16.7 | 16.7 | 11.2 | 14.0 | 19.5 | 22.2 |
| $B_2O_3$ | 33.0 | 33.0 | 32.9 | 32.9 | 38.1 | 35.5 | 30.5 | 28.0 |
| $K_2O$ | 0.0 | 0.0 | 0.0 | 0.0 | 0.0 | 0.0 | 0.0 | 0.0 |
| $Na_2O$ | 0.0 | 0.0 | 0.0 | 0.0 | 0.0 | 0.0 | 0.0 | 0.0 |
| $Li_2O$ | 0.0 | 0.0 | 0.0 | 0.0 | 0.0 | 0.0 | 0.0 | 0.0 |
| ZnO | 13.4 | 13.4 | 13.4 | 13.3 | 13.5 | 13.4 | 13.3 | 13.3 |
| MgO | 0.0 | 0.0 | 0.0 | 0.0 | 0.0 | 0.0 | 0.0 | 0.0 |
| SrO | 0.0 | 0.0 | 0.0 | 0.0 | 0.0 | 0.0 | 0.0 | 0.0 |
| BaO | 0.0 | 0.0 | 0.0 | 0.0 | 0.0 | 0.0 | 0.0 | 0.0 |
| $Al_2O_3$ | 0.0 | 0.0 | 0.0 | 0.0 | 0.0 | 0.0 | 0.0 | 0.0 |
| $ZrO_2$ | 2.7 | 2.7 | 2.7 | 2.7 | 2.7 | 2.7 | 2.7 | 2.7 |
| $La_2O_3$ | 16.9 | 17.9 | 18.9 | 19.9 | 17.0 | 16.9 | 16.8 | 16.7 |
| $Nb_2O_5$ | 0.0 | 0.0 | 0.0 | 0.0 | 0.0 | 0.0 | 0.0 | 0.0 |
| $TiO_2$ | 0.0 | 0.0 | 0.0 | 0.0 | 0.0 | 0.0 | 0.0 | 0.0 |
| $Ta_2O_5$ | 3.4 | 3.4 | 3.4 | 3.4 | 3.4 | 3.4 | 3.4 | 3.4 |
| $Gd_2O_3$ | 13.9 | 12.9 | 12.0 | 11.1 | 14.0 | 13.9 | 13.8 | 13.8 |
| $Y_2O_3$ | 0.0 | 0.0 | 0.0 | 0.0 | 0.0 | 0.0 | 0.0 | 0.0 |
| $Yb_2O_3$ | 0.0 | 0.0 | 0.0 | 0.0 | 0.0 | 0.0 | 0.0 | 0.0 |
| $WO_3$ | 0.0 | 0.0 | 0.0 | 0.0 | 0.0 | 0.0 | 0.0 | 0.0 |
| $SiO_2/B_2O_3$ (molar ratio) | 0.51 | 0.51 | 0.51 | 0.51 | 0.29 | 0.39 | 0.64 | 0.79 |
| nd | 1.84391 | 1.84279 | 1.84478 | 1.84561 | 1.84092 | 1.84248 | 1.84505 | 1.84526 |
| vd | 44.6 | 44.1 | 44.3 | 44.6 | 45.2 | 44.8 | 44.7 | 44.4 |
| Liquidus temperature (° C.) | 1225 | 1275 | 1275 | 1275 | 1270 | 1270 | 1225 | 1270 |

TABLE III-2

| Component (% by mole) | Example | | | | | | | |
|---|---|---|---|---|---|---|---|---|
| | III-9 | III-10 | III-11 | III-12 | III-13 | III-14 | III-15 | III-16 |
| $SiO_2$ | 18.2 | 16.9 | 14.2 | 8.7 | 19.5 | 19.6 | 19.8 | 18.2 |
| $B_2O_3$ | 30.6 | 30.8 | 31.2 | 31.9 | 29.4 | 28.3 | 26.1 | 30.6 |
| $K_2O$ | 0.0 | 0.0 | 0.0 | 0.0 | 0.0 | 0.0 | 0.0 | 0.9 |
| $Na_2O$ | 0.0 | 0.0 | 0.0 | 0.0 | 0.0 | 0.0 | 0.0 | 0.0 |
| $Li_2O$ | 0.0 | 0.0 | 0.0 | 0.0 | 0.0 | 0.0 | 0.0 | 0.0 |
| ZnO | 13.4 | 13.5 | 13.6 | 14.0 | 13.4 | 13.4 | 13.5 | 13.4 |
| MgO | 0.0 | 0.0 | 0.0 | 0.0 | 0.0 | 0.0 | 0.0 | 0.0 |
| SrO | 0.0 | 0.0 | 0.0 | 0.0 | 0.0 | 0.0 | 0.0 | 0.0 |
| BaO | 0.0 | 0.0 | 0.0 | 0.0 | 0.0 | 0.0 | 0.0 | 0.0 |
| $Al_2O_3$ | 0.8 | 1.7 | 3.4 | 6.9 | 0.8 | 1.7 | 3.3 | 0.0 |
| $ZrO_2$ | 2.7 | 2.7 | 2.8 | 2.8 | 2.7 | 2.7 | 2.8 | 2.7 |
| $La_2O_3$ | 16.9 | 17.0 | 17.2 | 17.6 | 16.9 | 16.9 | 17.1 | 16.9 |
| $Nb_2O_5$ | 0.0 | 0.0 | 0.0 | 0.0 | 0.0 | 0.0 | 0.0 | 0.0 |
| $TiO_2$ | 0.0 | 0.0 | 0.0 | 0.0 | 0.0 | 0.0 | 0.0 | 0.0 |
| $Ta_2O_5$ | 3.4 | 3.4 | 3.5 | 3.6 | 3.4 | 3.4 | 3.5 | 3.4 |
| $Gd_2O_3$ | 13.9 | 14.0 | 14.1 | 14.5 | 13.9 | 13.9 | 14.0 | 13.9 |
| $Y_2O_3$ | 0.0 | 0.0 | 0.0 | 0.0 | 0.0 | 0.0 | 0.0 | 0.0 |
| $Yb_2O_3$ | 0.0 | 0.0 | 0.0 | 0.0 | 0.0 | 0.0 | 0.0 | 0.0 |
| $WO_3$ | 0.0 | 0.0 | 0.0 | 0.0 | 0.0 | 0.0 | 0.0 | 0.0 |
| $SiO_2/B_2O_3$ (molar ratio) | 0.59 | 0.55 | 0.46 | 0.27 | 0.66 | 0.69 | 0.76 | 0.59 |
| nd | 1.84549 | 1.84844 | 1.84854 | 1.85210 | 1.84503 | 1.84682 | 1.84987 | 1.84495 |
| νd | 44.9 | 44.6 | 44.3 | 43.8 | 44.3 | 44.3 | 44.1 | 44.6 |
| Liquidus temperature (° C.) | 1235 | 1235 | 1275 | 1275 | 1235 | 1235 | 1280 | 1235 |

TABLE III-3

| Component (% by mole) | Example | | | | | | | |
|---|---|---|---|---|---|---|---|---|
| | III-17 | III-18 | III-19 | III-20 | III-21 | III-22 | III-23 | III-24 |
| $SiO_2$ | 16.8 | 18.1 | 16.7 | 18.2 | 16.9 | 17.9 | 18.2 | 19.4 |
| $B_2O_3$ | 30.8 | 30.5 | 30.5 | 30.6 | 30.8 | 30.3 | 30.7 | 30.4 |
| $K_2O$ | 1.8 | 0.0 | 0.0 | 0.0 | 0.0 | 0.0 | 0.0 | 0.0 |
| $Na_2O$ | 0.0 | 1.3 | 2.7 | 0.0 | 0.0 | 0.0 | 0.0 | 0.0 |
| $Li_2O$ | 0.0 | 0.0 | 0.0 | 0.0 | 0.0 | 0.0 | 0.0 | 0.0 |
| ZnO | 13.5 | 13.3 | 13.3 | 13.4 | 13.5 | 13.2 | 13.5 | 13.3 |
| MgO | 0.0 | 0.0 | 0.0 | 0.0 | 0.0 | 2.1 | 0.0 | 0.0 |
| SrO | 0.0 | 0.0 | 0.0 | 0.8 | 1.6 | 0.0 | 0.0 | 0.0 |
| BaO | 0.0 | 0.0 | 0.0 | 0.0 | 0.0 | 0.0 | 0.5 | 0.0 |
| $Al_2O_3$ | 0.0 | 0.0 | 0.0 | 0.0 | 0.0 | 0.0 | 0.0 | 0.0 |
| $ZrO_2$ | 2.7 | 2.7 | 2.7 | 2.7 | 2.7 | 2.7 | 2.7 | 2.7 |
| $La_2O_3$ | 17.0 | 16.8 | 16.8 | 16.9 | 17.0 | 16.7 | 17.0 | 16.3 |
| $Nb_2O_5$ | 0.0 | 0.0 | 0.0 | 0.0 | 0.0 | 0.0 | 0.0 | 0.6 |
| $TiO_2$ | 0.0 | 0.0 | 0.0 | 0.0 | 0.0 | 0.0 | 0.0 | 0.0 |
| $Ta_2O_5$ | 3.4 | 3.4 | 3.4 | 3.4 | 3.4 | 3.4 | 3.4 | 3.4 |
| $Gd_2O_3$ | 14.0 | 13.8 | 13.8 | 13.9 | 14.0 | 13.7 | 13.9 | 13.8 |
| $Y_2O_3$ | 0.0 | 0.0 | 0.0 | 0.0 | 0.0 | 0.0 | 0.0 | 0.0 |
| $Yb_2O_3$ | 0.0 | 0.0 | 0.0 | 0.0 | 0.0 | 0.0 | 0.0 | 0.0 |
| $WO_3$ | 0.0 | 0.0 | 0.0 | 0.0 | 0.0 | 0.0 | 0.0 | 0.0 |
| $SiO_2/B_2O_3$ (molar ratio) | 0.55 | 0.59 | 0.55 | 0.59 | 0.55 | 0.59 | 0.59 | 0.64 |
| nd | 1.84926 | 1.84321 | 1.84160 | 1.84698 | 1.84808 | 1.84661 | 1.84709 | 1.84775 |
| νd | 44.5 | 44.5 | 44.2 | 44.7 | 44.5 | 44.2 | 44.1 | 43.8 |
| Liquidus temperature (° C.) | 1280 | 1280 | 1280 | 1280 | 1295 | 1275 | 1290 | 1250 |

TABLE III-4

| Component (% by mole) | Example | | | | | | |
|---|---|---|---|---|---|---|---|
| | III-25 | III-26 | III-27 | III-28 | III-29 | III-30 | III-31 |
| $SiO_2$ | 19.5 | 19.4 | 19.4 | 19.6 | 19.2 | 19.6 | 19.6 |
| $B_2O_3$ | 30.5 | 30.4 | 30.3 | 30.6 | 30.1 | 30.6 | 30.6 |
| $K_2O$ | 0.0 | 0.0 | 0.0 | 0.0 | 0.0 | 0.0 | 0.0 |
| $Na_2O$ | 0.0 | 0.0 | 0.0 | 0.0 | 0.0 | 0.0 | 0.0 |
| $Li_2O$ | 0.0 | 0.0 | 0.0 | 0.0 | 0.0 | 0.0 | 0.0 |
| ZnO | 13.4 | 13.3 | 13.3 | 13.4 | 13.2 | 13.4 | 13.4 |
| MgO | 0.0 | 0.0 | 0.0 | 0.0 | 0.0 | 0.0 | 0.0 |

TABLE III-4-continued

| Component (% by mole) | III-25 | III-26 | III-27 | III-28 | III-29 | III-30 | III-31 |
|---|---|---|---|---|---|---|---|
| SrO | 0.0 | 0.0 | 0.0 | 0.0 | 0.0 | 0.0 | 0.0 |
| BaO | 0.0 | 0.0 | 0.0 | 0.0 | 0.0 | 0.0 | 0.0 |
| $Al_2O_3$ | 0.0 | 0.0 | 0.0 | 0.0 | 0.0 | 0.0 | 0.0 |
| $ZrO_2$ | 2.7 | 2.7 | 2.7 | 2.7 | 2.7 | 2.7 | 2.7 |
| $La_2O_3$ | 16.3 | 16.3 | 21.8 | 11.7 | 16.2 | 12.8 | 12.8 |
| $Nb_2O_5$ | 0.0 | 0.0 | 0.0 | 0.0 | 0.0 | 0.0 | 0.0 |
| $TiO_2$ | 0.0 | 0.0 | 0.0 | 0.0 | 1.7 | 0.0 | 0.0 |
| $Ta_2O_5$ | 3.8 | 3.4 | 3.4 | 3.4 | 3.4 | 3.4 | 3.4 |
| $Gd_2O_3$ | 13.8 | 13.8 | 9.2 | 18.5 | 13.6 | 16.2 | 16.2 |
| $Y_2O_3$ | 0.0 | 0.0 | 0.0 | 0.0 | 0.0 | 1.3 | 0.0 |
| $Yb_2O_3$ | 0.0 | 0.0 | 0.0 | 0.0 | 0.0 | 0.0 | 1.3 |
| $WO_3$ | 0.0 | 0.7 | 0.0 | 0.0 | 0.0 | 0.0 | 0.0 |
| $SiO_2/B_2O_3$ (molar ratio) | 0.64 | 0.64 | 0.64 | 0.64 | 0.64 | 0.64 | 0.64 |
| nd | 1.84512 | 1.84570 | 1.84592 | 1.84123 | 1.85046 | 1.84232 | 1.84045 |
| vd | 44.4 | 44.1 | 43.0 | 44.8 | 43.2 | 44.7 | 44.8 |
| Liquidus temperature (° C.) | 1250 | 1250 | 1290 | 1260 | 1260 | 1260 | 1250 |

TABLE III-5

| Component (% by mole) | III-1 | III-2 | III-3 | III-4 |
|---|---|---|---|---|
| $SiO_2$ | 8.5 | 8.5 | 24.8 | 40.5 |
| $B_2O_3$ | 40.8 | 40.9 | 25.5 | 10.9 |
| $K_2O$ | 0.0 | 0.0 | 0.0 | 0.0 |
| $Na_2O$ | 0.0 | 0.0 | 0.0 | 0.0 |
| $Li_2O$ | 0.0 | 0.0 | 0.0 | 0.0 |
| ZnO | 13.6 | 13.6 | 13.2 | 12.9 |
| MgO | 0.0 | 0.0 | 0.0 | 0.0 |
| SrO | 0.0 | 0.0 | 0.0 | 0.0 |
| BaO | 0.0 | 0.0 | 0.0 | 0.0 |
| $Al_2O_3$ | 0.0 | 0.0 | 0.0 | 0.0 |
| $ZrO_2$ | 2.8 | 2.8 | 2.7 | 2.6 |
| $La_2O_3$ | 14.5 | 11.4 | 16.7 | 16.3 |
| $Nb_2O_5$ | 0.0 | 0.0 | 0.0 | 0.0 |
| $TiO_2$ | 0.0 | 0.0 | 0.0 | 0.0 |
| $Ta_2O_5$ | 3.5 | 3.5 | 3.4 | 3.3 |
| $Gd_2O_3$ | 16.4 | 19.3 | 13.7 | 13.4 |
| $Y_2O_3$ | 0.0 | 0.0 | 0.0 | 0.0 |
| $Yb_2O_3$ | 0.0 | 0.0 | 0.0 | 0.0 |
| $WO_3$ | 0.0 | 0.0 | 0.0 | 0.0 |
| $SiO_2/B_2O_3$ (molar ratio) | 0.21 | 0.21 | 0.97 | 3.70 |
| nd | Devitrification | Devitrification | 1.84704 | Devitrification |
| vd | | | 44.5 | |
| Liquidus temperature (° C.) | | | 1335 | |

As seen from Tables III-1 to III-4 given above, the optical glass composition according to each of Examples III-1 to III-31 has a refractive index (nd) to the d-line falling within a high refractive index range of 1.83 or higher and 1.87 or lower and an Abbe number (vd) to the d-line falling within a lower to middle dispersion range of 43 or higher and 47 or lower, and yet has a low liquidus temperature of 1300° C. or lower.

TABLE IV-1

| Component (% by mole) | IV-1 | IV-2 | IV-3 | IV-4 | IV-5 | IV-6 | IV-7 | IV-8 | IV-9 |
|---|---|---|---|---|---|---|---|---|---|
| $SiO_2$ | 9.0 | 9.1 | 8.5 | 8.5 | 8.5 | 9.1 | 9.1 | 9.1 | 9.1 |
| $B_2O_3$ | 42.5 | 42.7 | 43.3 | 43.3 | 43.3 | 43.1 | 43.1 | 43.0 | 43.0 |
| $GeO_2$ | 0.0 | 0.0 | 0.0 | 0.0 | 0.0 | 0.0 | 0.0 | 0.0 | 0.0 |
| $Li_2O$ | 2.8 | 2.8 | 2.8 | 2.8 | 2.9 | 2.9 | 2.9 | 2.9 | 2.9 |
| ZnO | 4.2 | 4.2 | 4.2 | 4.2 | 4.2 | 4.2 | 4.2 | 4.2 | 4.2 |
| BaO | 0.0 | 0.0 | 0.0 | 0.0 | 0.0 | 0.0 | 0.0 | 0.0 | 0.0 |
| $ZrO_2$ | 8.2 | 7.6 | 7.6 | 7.6 | 7.6 | 6.3 | 6.3 | 6.3 | 6.2 |
| $La_2O_3$ | 14.4 | 14.5 | 14.5 | 12.5 | 11.5 | 15.7 | 16.7 | 17.8 | 18.8 |
| $Ta_2O_5$ | 5.7 | 6.0 | 6.0 | 6.0 | 6.0 | 6.4 | 6.4 | 6.4 | 6.4 |
| $Ta_2O_5 + ZrO_2$ | 13.9 | 13.6 | 13.6 | 13.6 | 13.6 | 12.7 | 12.7 | 12.7 | 12.6 |
| $Gd_2O_3$ | 13.1 | 13.1 | 13.1 | 15.1 | 16.0 | 12.3 | 11.3 | 10.3 | 9.4 |
| nd | 1.84727 | 1.84729 | 1.84884 | 1.84686 | 1.84612 | 1.84692 | 1.84686 | 1.84641 | 1.84731 |
| vd | 43.2 | 44.1 | 43.3 | 43.6 | 43.6 | 44.1 | 43.2 | 43.3 | 43.1 |
| Liquidus temperature (° C.) | 1165 | 1165 | 1175 | 1175 | 1175 | 1185 | 1145 | 1145 | 1185 |

TABLE IV-2

| Component | Example | | | | | | | |
|---|---|---|---|---|---|---|---|---|
| (% by mole) | IV-10 | IV-11 | IV-12 | IV-13 | IV-14 | IV-15 | IV-16 | IV-17 |
| $SiO_2$ | 8.7 | 8.6 | 8.0 | 8.5 | 8.4 | 8.4 | 8.9 | 8.6 |
| $B_2O_3$ | 41.1 | 40.5 | 40.6 | 43.0 | 43.0 | 42.9 | 41.8 | 40.8 |
| $GeO_2$ | 0.0 | 0.0 | 0.0 | 0.0 | 0.0 | 0.0 | 0.0 | 7.8 |
| $Li_2O$ | 2.7 | 2.7 | 2.7 | 2.8 | 2.8 | 2.8 | 2.8 | 2.7 |
| ZnO | 10.1 | 11.9 | 11.8 | 4.2 | 4.2 | 4.1 | 4.1 | 4.0 |
| BaO | 0.0 | 0.0 | 0.0 | 0.0 | 0.0 | 0.0 | 5.4 | 0.0 |
| $ZrO_2$ | 6.0 | 5.9 | 7.1 | 8.2 | 8.2 | 8.2 | 6.1 | 5.9 |
| $La_2O_3$ | 14.0 | 13.8 | 13.6 | 15.5 | 16.5 | 18.5 | 13.7 | 13.4 |
| $Ta_2O_5$ | 6.1 | 6.0 | 5.6 | 6.3 | 6.3 | 6.3 | 6.2 | 6.1 |
| $Ta_2O_5 + ZrO_2$ | 12.1 | 11.9 | 12.7 | 14.5 | 14.5 | 14.5 | 12.3 | 12.0 |
| $Gd_2O_3$ | 11.3 | 10.7 | 10.6 | 11.4 | 10.5 | 8.6 | 11.0 | 10.7 |
| nd | 1.84227 | 1.84219 | 1.84263 | 1.84948 | 1.85063 | 1.85045 | 1.83728 | 1.83369 |
| vd | 43.3 | 43.3 | 44.0 | 43.3 | 43.2 | 44.0 | 43.3 | 43.1 |
| Liquidus temperature (° C.) | 1155 | 1155 | 1155 | 1180 | 1140 | 1180 | 1170 | 1170 |

TABLE IV-3

| Component | Comparative Example | | |
|---|---|---|---|
| (% by mole) | IV-1 | IV-2 | IV-3 |
| $SiO_2$ | 11.1 | 13.9 | 8.0 |
| $B_2O_3$ | 37.8 | 35.2 | 38.5 |
| $GeO_2$ | 0.0 | 0.0 | 0.0 |
| $Li_2O$ | 2.8 | 2.8 | 2.7 |
| ZnO | 6.2 | 6.2 | 11.8 |
| BaO | 0.0 | 0.0 | 0.0 |
| $ZrO_2$ | 8.2 | 8.1 | 7.8 |
| $La_2O_3$ | 17.6 | 17.6 | 15.4 |
| $Ta_2O_5$ | 2.5 | 2.5 | 2.4 |
| $Ta_2O_5 + ZrO_2$ | 10.7 | 10.6 | 10.2 |
| $Gd_2O_3$ | 13.9 | 13.8 | 13.3 |
| nd | 1.84692 | 1.85019 | Devitrification |
| vd | 45.0 | 44.8 | |
| Liquidus temperature (° C.) | 1365 | 1365 | |

As seen from Tables IV-1 to IV-2 given above, the optical glass composition according to each of Examples IV-1 to IV-17 has a refractive index (nd) to the d-line falling within a high refractive index range of 1.83 or higher and 1.86 or lower and an Abbe number (vd) to the d-line falling within a lower to middle dispersion range of 43 or higher and 45 or lower, and yet has a low liquidus temperature of 1200° C. or lower.

TABLE V-1

| Component | Example | | | | | | | | |
|---|---|---|---|---|---|---|---|---|---|
| (% by mole) | V-1 | V-2 | V-3 | V-4 | V-5 | V-6 | V-7 | V-8 | V-9 |
| $SiO_2$ | 9.1 | 8.5 | 8.5 | 8.5 | 8.5 | 9.1 | 9.1 | 9.1 | 9.1 |
| $B_2O_3$ | 42.7 | 43.3 | 43.3 | 43.3 | 43.3 | 43.1 | 43.1 | 43.0 | 43.0 |
| $GeO_2$ | 0.0 | 0.0 | 0.0 | 0.0 | 0.0 | 0.0 | 0.0 | 0.0 | 0.0 |
| $Li_2O$ | 2.8 | 2.8 | 2.8 | 2.8 | 2.9 | 2.9 | 2.9 | 2.9 | 2.9 |
| ZnO | 4.2 | 4.2 | 4.2 | 4.2 | 4.2 | 4.2 | 4.2 | 4.2 | 4.2 |
| BaO | 0.0 | 0.0 | 0.0 | 0.0 | 0.0 | 0.0 | 0.0 | 0.0 | 0.0 |
| $ZrO_2$ | 7.6 | 7.6 | 7.6 | 7.6 | 7.6 | 6.3 | 6.3 | 6.3 | 6.2 |
| $La_2O_3$ | 14.5 | 14.5 | 13.5 | 12.5 | 11.5 | 15.7 | 16.7 | 17.8 | 18.8 |
| $Ta_2O_5$ | 6.0 | 6.0 | 6.0 | 6.0 | 6.0 | 6.4 | 6.4 | 6.4 | 6.4 |
| $Ta_2O_5 + ZnO$ | 10.2 | 10.2 | 10.2 | 10.2 | 10.2 | 10.6 | 10.6 | 10.6 | 10.6 |
| $Gd_2O_3$ | 13.1 | 13.1 | 14.1 | 15.1 | 16.0 | 12.3 | 11.3 | 10.3 | 9.4 |
| nd | 1.84729 | 1.84884 | 1.84815 | 1.84686 | 1.84612 | 1.84692 | 1.84686 | 1.84641 | 1.84731 |
| vd | 44.1 | 43.3 | 43.1 | 43.6 | 43.6 | 44.1 | 43.2 | 43.3 | 43.1 |
| Liquidus temperature (° C.) | 1165 | 1175 | 1175 | 1175 | 1175 | 1185 | 1145 | 1145 | 1185 |

TABLE V-2

| Component | Example | | | | | | | |
|---|---|---|---|---|---|---|---|---|
| (% by mole) | V-10 | V-11 | V-12 | V-13 | V-14 | V-15 | V-16 | V-17 |
| $SiO_2$ | 8.7 | 8.6 | 8.0 | 8.5 | 8.4 | 8.4 | 8.9 | 8.6 |
| $B_2O_3$ | 41.1 | 40.5 | 40.6 | 43.0 | 43.0 | 42.9 | 41.8 | 40.8 |
| $GeO_2$ | 0.0 | 0.0 | 0.0 | 0.0 | 0.0 | 0.0 | 0.0 | 7.8 |
| $Li_2O$ | 2.7 | 2.7 | 2.7 | 2.8 | 2.8 | 2.8 | 2.8 | 2.7 |
| ZnO | 10.1 | 11.9 | 11.8 | 4.2 | 4.2 | 4.1 | 4.1 | 4.0 |
| BaO | 0.0 | 0.0 | 0.0 | 0.0 | 0.0 | 0.0 | 5.4 | 0.0 |
| $ZrO_2$ | 6.0 | 5.9 | 7.1 | 8.2 | 8.2 | 8.2 | 6.1 | 5.9 |

TABLE V-2-continued

| Component | Example | | | | | | | |
|---|---|---|---|---|---|---|---|---|
| (% by mole) | V-10 | V-11 | V-12 | V-13 | V-14 | V-15 | V-16 | V-17 |
| $La_2O_3$ | 14.0 | 13.8 | 13.6 | 15.5 | 16.5 | 18.5 | 13.7 | 13.4 |
| $Ta_2O_5$ | 6.1 | 6.0 | 5.6 | 6.3 | 6.3 | 6.3 | 6.2 | 6.1 |
| $Ta_2O_5 + ZnO$ | 16.2 | 17.9 | 17.4 | 10.5 | 10.5 | 10.4 | 10.3 | 10.1 |
| $Gd_2O_3$ | 11.3 | 10.7 | 10.6 | 11.4 | 10.5 | 8.6 | 11.0 | 10.7 |
| nd | 1.84227 | 1.84219 | 1.84263 | 1.84948 | 1.85063 | 1.85045 | 1.83728 | 1.83369 |
| vd | 43.3 | 43.3 | 44.0 | 43.3 | 43.2 | 44.0 | 43.3 | 43.1 |
| Liquidus temperature (° C.) | 1155 | 1155 | 1155 | 1180 | 1140 | 1180 | 1170 | 1170 |

TABLE V-3

| Component | Comparative Example | |
|---|---|---|
| (% by mole) | V-1 | V-2 |
| $SiO_2$ | 11.1 | 13.9 |
| $B_2O_3$ | 37.8 | 35.2 |
| $GeO_2$ | 0.0 | 0.0 |
| $Li_2O$ | 2.8 | 2.8 |
| ZnO | 6.2 | 6.2 |
| BaO | 0.0 | 0.0 |
| $ZrO_2$ | 8.2 | 8.1 |
| $La_2O_3$ | 17.6 | 17.6 |
| $Ta_2O_5$ | 2.5 | 2.5 |
| $Ta_2O_5 + ZnO$ | 8.7 | 8.7 |
| $Gd_2O_3$ | 13.9 | 13.8 |
| nd | 1.84692 | 1.85019 |
| vd | 45.0 | 44.8 |
| Liquidus temperature (° C.) | 1365 | 1365 |

As seen from Tables V-1 to V-2 given above, the optical glass composition according to each of Examples V-1 to V-17 has a refractive index (nd) to the d-line falling within a high refractive index range of 1.83 or higher and 1.86 or lower and an Abbe number (vd) to the d-line falling within a lower to middle dispersion range of 43 or higher and 46 or lower, and yet has a low liquidus temperature of 1200° C. or lower.

The optical glass composition of the present invention is suitable as the material of optical elements such as lens elements contained in a shooting lens system of a digital camera. Further, the optical glass composition of the present invention may be applied, for example, to lens elements of a pickup optical system used in an optical head device or to lens elements of an illumination optical system and a projection optical system used in a projector device. Then, the performance of these devices can be improved.

Although the present invention has been fully described by way of example with reference to the accompanying drawings, it is to be understood that various changes and modifications will be apparent to those skilled in the art. Therefore, unless otherwise such changes and modification depart from the scope of the present invention, they should be construed as being included therein.

What is claimed is:

1. An optical glass composition comprising, in % by mole,
  0-25.0% of $SiO_2$,
  20.0-40.0% of $B_2O_3$,
  3.0-15.0% of ZnO,
  0-10.0% $ZrO_2$,
  2.0-7.0% of $Ta_2O_5$,
  6.0-25.0% of $La_2O_3$,
  5.0-22.0% of $Gd_2O_3$,
  66.5% or less of $La_2O_3+Gd_2O_3+B_2O_3$ and
  26.0% or more of $La_2O_3+Gd_2O_3$, wherein
  the composition contains no $Li_2O$, and wherein
  the composition has a refractive index (nd) to the d-line of 1.83-1.86, an Abbe number (vd) to the d-line of 43-46, and a liquidus temperature of 1300° C. or lower.

2. A preform comprising the optical glass composition as claimed in claim 1, that is softened by heating so as to be used at least for press molding.

3. An optical element comprising the optical glass composition as claimed in claim 1.

4. The optical glass composition as claimed in claim 1, having the refractive index (nd) to the d-line of 1.84045-1.86.

5. An optical glass composition comprising, in % by mole,
  5.0-25.0% of $SiO_2$,
  25.0-40.0% of $B_2O_3$,
  10.0-15.0% of ZnO,
  0-5.0% of $ZrO_2$,
  10.0-25.0% of $La_2O_3$,
  5.0-20.0% of $Gd_2O_3$ and
  0-5.0% of $Ta_2O_5$, wherein
  $La_2O_3/Gd_2O_3$ is, in molar ratio, more than 0 and less than 3.5, wherein
  the composition contains no $Li_2O$, and wherein
  the composition has a refractive index (nd) to the d-line of 1.83-1.87, an Abbe number (vd) to the d-line of 43-47, and a liquidus temperature of 1300° C. or lower.

6. A preform comprising the optical glass composition as claimed in claim 5, that is softened by heating so as to be used at least for press molding.

7. An optical element comprising the optical glass composition as claimed in claim 5.

8. The optical glass composition as claimed in claim 5, having the refractive index (nd) to the d-line of 1.84045-1.87.

9. An optical glass composition comprising, in % by mole,
  5.0-25.0% of $SiO_2$,
  20.0-40.0% of $B_2O_3$,
  0-15.0% of ZnO,
  0-5.0% of $ZrO_2$,
  10.0-25.0% of $La_2O_3$,
  0-5.0% of $Ta_2O_5$ and
  5.0-20.0% of $Gd_2O_3$, wherein
  $SiO_2/B_2O_3$ is, in molar ratio, 0.25-0.90, wherein
  the composition contains no $Li_2O$, and wherein
  the composition has a refractive index (nd) to the d-line of 1.83-1.87, an Abbe number (vd) to the d-line of 43-47, and a liquidus temperature of 1300° C. or lower.

10. A preform comprising the optical glass composition as claimed in claim 9, that is softened by heating so as to be used at least for press molding.

11. An optical element comprising the optical glass composition as claimed in claim 9.

12. The optical glass composition as claimed in claim 9, having the refractive index (nd) to the d-line of 1.84045-1.87.

13. An optical glass composition comprising, in % by mole,
- 0-10.0% of $SiO_2$,
- 41.8-43.3% of $B_2O_3$,
- 0-5.0% of $Li_2O$,
- 0-12.0% ZnO,
- 0-10.0% of $ZrO_2$,
- 10.0-20.0% of $La_2O_3$,
- 3.0-10.0% of $Ta_2O_5$,
- 11.0-20.0% of $Ta_2O_5+ZrO_2$ and
- 5.0-20.0% of $Gd_2O_3$, and having
  a refractive index (nd) to the d-line of 1.83-1.86, an Abbe number (vd) to the d-line of 43-45, and a liquidus temperature of 1200° C. or lower.

14. A preform comprising the optical glass composition as claimed in claim 13, that is softened by heating so as to be used at least for press molding.

15. An optical element comprising the optical glass composition as claimed in claim 13.

16. The optical glass composition as claimed in claim 13, having the refractive index (nd) to the d-line of 1.84612-1.86.

17. An optical glass composition comprising, in % by mole,
- 0-10.0% of $SiO_2$,
- 41.8-43.3% of $B_2O_3$,
- 0-5.0% of $Li_2O$,
- 0-12.0% of ZnO,
- 0-10.0% of $ZrO_2$,
- 10.0-20.0% of $La_2O_3$,
- 3.0-10.0% of $Ta_2O_5$,
- 10.0-22.0% of $Ta_2O_5+ZnO$ and
- 5.0-20.0% of $Gd_2O_3$, and having
  a refractive index (nd) to the d-line of 1.83-1.86, an Abbe number (vd) to the d-line of 43-46, and a liquidus temperature of 1200° C. or lower.

18. A preform comprising the optical glass composition as claimed in claim 17, that is softened by heating so as to be used at least for press molding.

19. An optical element comprising the optical glass composition as claimed in claim 17.

20. The optical glass composition as claimed in claim 17, having the refractive index (nd) to the d-line of 1.84612-1.86.

21. An optical glass composition comprising, in % by mole,
- 0-25.0% of $SiO_2$,
- 20.0-40.0% of $B_2O_3$,
- 0-5.0% of $Li_2O$,
- 3.0-15.0% of ZnO,
- 0-10.0% of $ZrO_2$,
- 2.0-7.0% of $Ta_2O_5$,
- 6-25.0% of $La_2O_3$,
- 5.0-22.0% of $Gd_2O_3$,
- 66.5% or less of $La_2O_3+Gd_2O_3+B_2O_3$ and
- 28.0% or more of $La_2O_3+Gd_2O_3$, and having
  a refractive index (nd) to the d-line of 1.83-1.86, an Abbe number (vd) to the d-line of 43-46, and a liquidus temperature of 1300° C. or lower.

22. A preform comprising the optical glass composition as claimed in claim 21, that is softened by heating so as to be used at least for press molding.

23. An optical element comprising the optical glass composition as claimed in claim 21.

24. The optical glass composition as claimed in claim 21, having the refractive index (nd) to the d-line of 1.84045-1.86.

25. An optical glass composition comprising, in % by mole,
- 0-10.0% of $SiO_2$,
- 30.0-45.0% of $B_2O_3$,
- 0-5.0% of $Li_2O$,
- 0-12.0% of ZnO,
- 0-10.0% of $ZrO_2$,
- 10.0-20.0% of $La_2O_3$,
- 3.0-10.0% of $Ta_2O_5$,
- 12.3-20.0% of $Ta_2O_5+ZrO_2$ and
- 5.0-20.0% of $Gd_2O_3$, and having
  a refractive index (nd) to the d-line of 1.83-1.86, an Abbe number (vd) to the d-line of 43-45, and a liquidus temperature of 1200° C. or lower.

26. A preform comprising the optical glass composition as claimed in claim 25, that is softened by heating so as to be used at least for press molding.

27. An optical element comprising the optical glass composition as claimed in claim 25.

28. The optical glass composition as claimed in claim 25, having the refractive index (nd) to the d-line of 1.84263-1.86.

* * * * *